United States Patent [19]

Minowa et al.

[11] Patent Number: 5,894,724
[45] Date of Patent: Apr. 20, 1999

[54] ENGINE SYSTEM AND ENGINE CONTROL METHOD

[75] Inventors: Toshimichi Minowa, Mito; Yoshiyuki Yoshida; Tatsuya Ochi, both of Hitachi; Mineo Kashiwaya; Yoshishige Ohyama, both of Hitachinaka, all of Japan

[73] Assignee: Hitachi, Ltd., Japan

[21] Appl. No.: 08/599,169

[22] Filed: Feb. 9, 1996

[30]    Foreign Application Priority Data

Feb. 9, 1995 [JP] Japan .................. 7-022109

[51] Int. Cl.$^6$ ........................... F01N 3/00

[52] U.S. Cl. .................. 60/274; 60/284; 60/285

[58] Field of Search .................. 60/285, 284, 274

[56]    References Cited

U.S. PATENT DOCUMENTS 5,211,011  5/1993  Nishikawa ..................... 60/284

Primary Examiner—Thomas E. Denion
Attorney, Agent, or Firm—Evenson, McKeown, Edwards & Lenahan, P.L.L.C.

[57]    ABSTRACT

In an engine system, an ignition timing is changed in accordance with operation parameters of an engine. The engine system includes an exhaust gas clarifying equipment with a catalyst to clarify the specified components in the exhaust gas, catalyst temperature detecting unit for estimating or detecting the temperature of the catalyst, torque fluctuation detecting unit for detecting the state of fluctuation of an output torque of the engine, and ignition timing calculating unit for calculating the final ignition timing on the basis of the detected results of the torque fluctuation detecting unit and the catalyst temperature detecting unit.

20 Claims, 26 Drawing Sheets

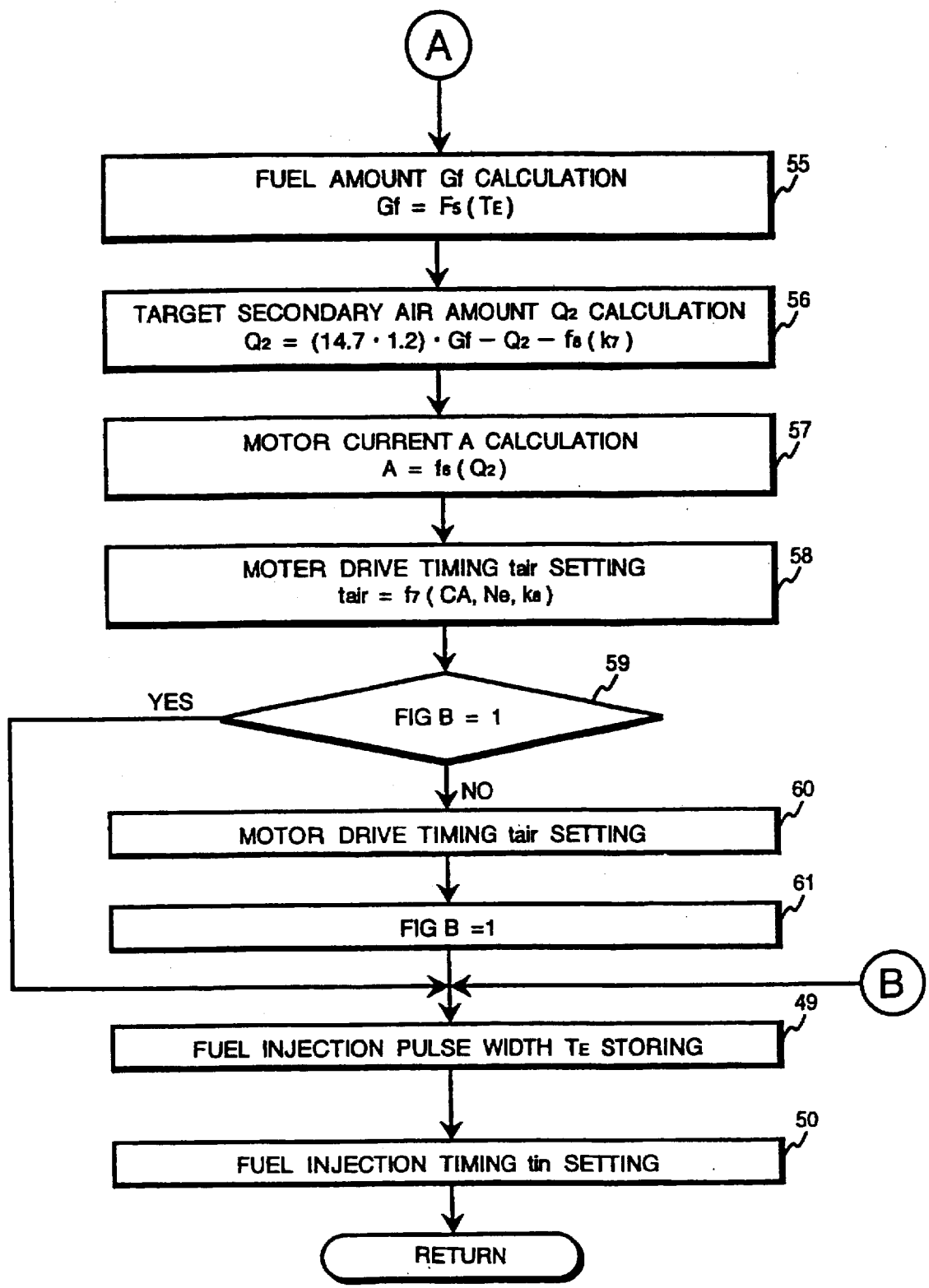

ENGINE SYSTEM AND ENGINE CONTROL METHOD

BACKGROUND OF THE INVENTION

The present invention relates to an engine system and engine control method, in which a catalyst can be warmed up fast after the start of an engine when the engine and the catalyst is still in a cold state.

Harmful components in exhaust gas of an internal combustion engine cause the problem of air pollution. Therefore, a catalyst converter is generally used in the internal combustion engine, which converts the harmful materials to harmless materials.

The catalyst converter does not work sufficiently when the temperature of the catalyst does not reach the predetermined temperature. Therefore, the harmful components are not processed and emitted as they are, when the catalyst is in a cold state (for example, just after the start of an engine). In order to solve such the problem, various methods of warming up fast the catalyst have been proposed in the prior art.

For example, Japanese Patent Application Laid-Open No. 61-205376 and Japanese Patent Application Laid-Open No. 6-213125 disclose a method of activating fast a catalyst due to increased temperature of exhaust gas, in which the amount of correction of retard of an ignition timing is increased according to the temperature of the engine in a cold state, that is, the increasement state of the temperature of a coolant, or the elapsed time after the start of the engine.

It is, however, difficult to warm up the catalyst with giving a comfortable feeling of acceleration in the prior art, because the ignition timing is retarded due to indirect informations such as the temperature of the coolant of the engine, etc.

SUMMARY OF THE INVENTION

An object of the present invention is to provide an engine system in which a stable operation can be maintained from the standing start under warming-up to the running under acceleration, the temperature of catalyst can be rapidly increased up, and the harmful exhaust gas can be clarified fast.

The first aspect of the present invention relates to an engine system. In the engine system, an ignition timing is changed in accordance with the operation parameters of the engine. The engine system includes an exhaust gas clarifying equipment with a catalyst to clarify the specified components in the exhaust gas, catalyst temperature detecting means for estimating or detecting the temperature of the catalyst, torque fluctuation detecting means for detecting the state of the fluctuation of an output torque of the engine, and ignition timing calculating means for calculating the final ignition timing on the basis of the detected results of the torque fluctuation detecting means and the catalyst temperature detecting means.

The ignition timing calculating means advance the final ignition timing when the fluctuation of output torque of the engine is larger than the predetermined value, as compared with it is smaller than one.

Preferably, the ignition timing calculating means include correction ignition timing calculating means for calculating the correction amount of retard on the basis of the detected results of said catalyst temperature detecting means and said torque fluctuation detecting means, and final ignition timing calculating means for calculating the final ignition timing, by using the correction amount of retard and a normal ignition timing determined in accordance with the operation parameter of the engine.

Advantageously, the correction ignition timing calculating means lessen the correction amount of retard angle when the fluctuation of output torque of the engine is larger than the predetermined value.

Advantageously, the torque fluctuation detecting means detect the timing at which the output torque of the engine reaches its peak, and detect the fluctuation of output torque on the basis of the magnitude of variations of the timing.

Preferably, the torque fluctuation detecting means include crank angle detecting means and calculating means for calculating the time-varing rate of the crank angle.

Preferably, the torque fluctuation detecting means include cylinder internal pressure detecting means for detecting the internal pressure of a combustion chamber of the engine.

Advantageously, the ignition timing calculating means determine the ignition timing obtained on the basis of the operation parameters of the engine as the final ignition timing, when the temperature of catalyst is outside the predetermined range.

Preferably, the ignition timing calculating means include correction ignition timing calculating means for calculating the correction amount of retard on the basis of the detected results of the catalyst temperature detecting means and the torque fluctuation detecting means, and final ignition timing calculating means for obtaining the final ignition timing, by using the correction amount of retard angle and a normal ignition timing determined in accordance with the operation parameter of the engine.

Preferably, the correction ignition timing calculating means set the correction amount of retard to zero when the temperature of the catalyst is outside the predetermined range.

Preferably, the predetermined range of temperature is between the temperature at which the catalyst starts clarification of CO and the temperature at which it starts clarification of HC.

In a preferred embodiment, the engine system includes further exhaust gas state detecting means for detecting the components of exhaust gas or air/fuel ratio, reaction start determining means for determining whether or not the temperature of the catalyst reaches the temperature at which it becomes possible to clarify the specified materials, on the basis of the temperature of the catalyst obtained by the catalyst temperature detecting means, target secondary air amount setting means for determining air amount induced to an exhaust pipe, on the basis of the detected result of the exhaust gas state detecting means, and secondary air inducing means for inducing the air amount determined by the target secondary air amount setting means into the exhaust pipe in the upper stream of the exhaust gas clarifying equipment, when the reaction start determining means determine that the temperature of the catalyst reaches the temperature at which it becomes possible to clarify the specified materials.

Preferably, the engine system includes further crank angle detecting means for detecting a crank angle of the engine, wherein the secondary air inducing means start to induce an air to the exhaust pipe at the timing when an exhaust valve of the engine is closed, on the basis of the result detected by the crank angle detecting means.

Preferably, the engine system further includes air/fuel ratio control means for controlling independently the air/fuel ratio of air mixture in each cylinder, wherein said secondary air inducing means induce an air to the exhaust pipe at the timing when an exhaust valve in the cylinder which the amount of fuel injection is increased is closed, in order to lessen the target air/fuel ratio provided to the engine by the air/fuel ratio control means.

In a further embodiment, the engine system further include crank angle detecting means for detecting an engine speed and a crank angle, target air/fuel ratio setting means for setting the air/fuel ratio of air mixture supplied to the engine, fuel injection amount calculating means for obtaining the amount of fuel injection required to realize the air/fuel ratio set by the target air fuel ratio setting means, reaction start determining means for determing whether or not the catalyst reaches the temperature at which it becomes possible to clarify the specified material on the basis of the temperature of the catalyst obtained by the catalyst temperature detecting means, and fuel injection system for supplying to the engine the amount of the fuel injection obtained by the fuel injection amount calculating means, when the reaction start determining means determine that the temperature of the catalyst reaches the temperature at which it becomes possible to clarify the specified materials.

Preferably, the engine system further include air mixture forming means for adjusting the state of mixture of the air mixture supplied to the engine.

It is desirable that in the engine system, the air mixture forming means change the state of mixing of the air mixture in accordance with opening of a throttle valve of the engine.

Preferably, the engine system further include an accelerator pedal operated by a user, and an electronically controlled throttle for adjusting opening of a throttle valve in accordance with the amount of operation of the accelerator, wherein the electronically controlled throttle changes the relationship between the amount of operation of the accelerator pedal and the opening of the throttle valve in accordance with the correction amount of retard determined by the ignition timing calculating means.

The second aspect of the present invention relates to a method of controlling an engine. The method includes the steps of monitoring the fluctuation of output torque of the engine and the state of warming-up of the engine, and retarding an ignition timing by the amount of retard determined based on the magnitude of the change in the output torque of the engine and the state of warming-up of the engine.

In the engine control method, the state of warming-up of the engine is represented typically by the temperature of engine coolant and the temperature of a catalyst used for clarifying the specified components in exhaust gas.

The third aspect of the present invention relates to a method of controlling an automatic transmission. The method includes the step of changing the oil pressure required to engage a clutch in accordance with the magnitude of an input torque.

In operation of such an engine system, the catalyst temperature detecting means may detect or estimate the temperature of a catalyst.

The torque fluctuation detecting means detect the state of fluctuation of the output torque of an engine. The state of fluctuation of the output torque may be detected on the basis of the variations in the timing when the output torque of the engine reaches its peak. It is possible to detect the fluctuation of the output torque by detecting an internal pressure of a combustion chamber of the engine by using cylinder internal pressure detecting means, and then detecting the timing when the internal pressure reaches its peak. Further, it may be possible to obtain the time-varing rate of a crank angular velocity on the basis of the crank angular velocity detected by the crank angle detecting means.

The ignition timing calculating means (correction ignition timing calculating means, final ignition timing calculating means) calculate the final ignition timing on the basis of operation parameters of the engine, and the results detected by catalyst temperature detecting means and the torque fluctuation detecting means. In this case, the ignition timing calculating means advance the final ignition timing when the fluctuation of output torque of the engine is larger than the predetermined value, as compared with it is smaller than one. The correction ignition timing calculating means calculate the correction amount of retard on the basis of the detected results of the catalyst temperature detecting means and the torque fluctuation detecting means. In this case, the correction amount of retard angle is lessen, when the fluctuation of output torque of the engine is larger than the predetermined value. The final ignition timing calculating means obtaine the final ignition timing, by using the correction amount of retard and a normal ignition timing determined in accordance with operation parameters of the engine.

Further, the ignition timing calculating means determine the ignition timing obtained on the basis of operation parameters of the engine as the final ignition timing, when the temperature of catalyst is outside the predetermined range. More concretely, the correction ignition timing calculating means set the correction amount of retard to zero when the temperature of the catalyst is outside the predetermined range.

The fuel injection amount calculating means obtain the amount of fuel injection required to realize the air/fuel ratio set by said target air fuel ratio setting means.

The reaction start determining means determine whether or not the catalyst reaches the temperature at which it becomes possible to clarify the specified materials (for example, CO) on the basis of the temperature of the catalyst obtained by the catalyst temperature detecting means. When the reaction start determining means determine that the temperature of the catalyst reaches the temperature at which it becomes possible to clarify the specified materials, the fuel injection means supply to the engine the amount of the fuel injection obtained by the fuel injection amount calculating means. Thereby, the specified materials (for example, CO) are efficiently produced, which form a heat source for heating the catalyst.

Target secondary air amount setting means determine air flow rate induced to an exhaust pipe, on the basis of the detected result of the exhaust gas state detecting means, and Secondary air inducing means for inducing the air flow rate determined by the target secondary air amount setting means into the exhaust pipe in the upper stream of the exhaust gas clarifying equipment, when the reaction start determining means determine that the temperature of the catalyst reaches the temperature at which it becomes possible to clarify the specified materials. Thereby, the specified materials (for example, CO) can be burned efficiently, which is the heat source for the above catalyst heating. In this case, if the secondary air inducing means start to induce an air to the exhaust pipe at the timing when an exhaust valve of the engine is closed (especially, the timing when the exhaust valve in the cylinder is closed, which the fuel injection amount is increased to decrease the target A/F supplied to the engine by the A/F control means), on the basis of the result detected by the crank angle detecting means, the force (or the current supplied to a motor, etc.) can be lessen, to drive the valve which controls the secondary air injection.

The air mixture forming means change the state of mixture of the air mixture in accordance with opening of a throttle valve of the engine. Thereby, it becomes possible to stabilize the burning of fuel, and extend the controllable boundaries of the ignition timing retard control.

The electronically controlled throttle changes the relationship between the amount of operation of the accelerator pedal and the opening of the throttle valve in accordance with the correction amount of retard determined by the ignition timing calculating means. Thereby, even if the torque of the engine is decreasing during the carrying-out of the ignition timing retard control, it is possible to prevent the change in the relationship between an accelerator pedal angle and the resultant feeling of acceleration.

As a result, it is possible to minimize the influence on the drivability, and warm up the catalyst in a short time.

The second aspect of the present invention will be explained next.

The fluctuation of output torque of the engine and the state of warming-up of the engine are monitored, and when the temperature of the catalyst is lower than the predetermined one, an ignition timing is retarded by the amount of retard determined based on the magnitude of the change in the output torque of the engine and the state of warming-up of the engine.

As a result, it is possible to minimize the influence on the drivability, and warm up the catalyst in a short time.

The third aspect of the present invention will be explained next.

The oil pressure required to engage a clutch is changed in accordance with the magnitude of input torque. Thereby, if the torque of the engine is decreasing due to a certain cause during the change of speed, it is possible to engage the clutch in a sufficient time, thus decrease the shock during the change of speed.

DESCRIPTION OF THE PREFERRED EMBODIMENTS OF THE INVENTION

Embodiments of the present invention will be explained in detail hereinafter.

Figure 1:
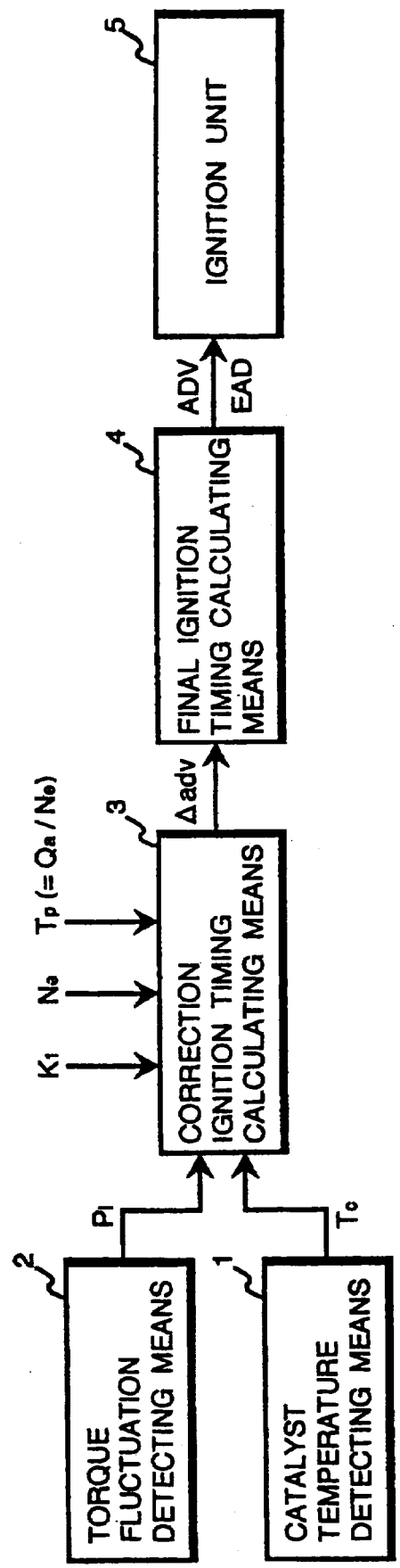
FIG. 1 is a block diagram showing an ignition timing control equipment used in an engine system according to the present invention.
Figure 2:
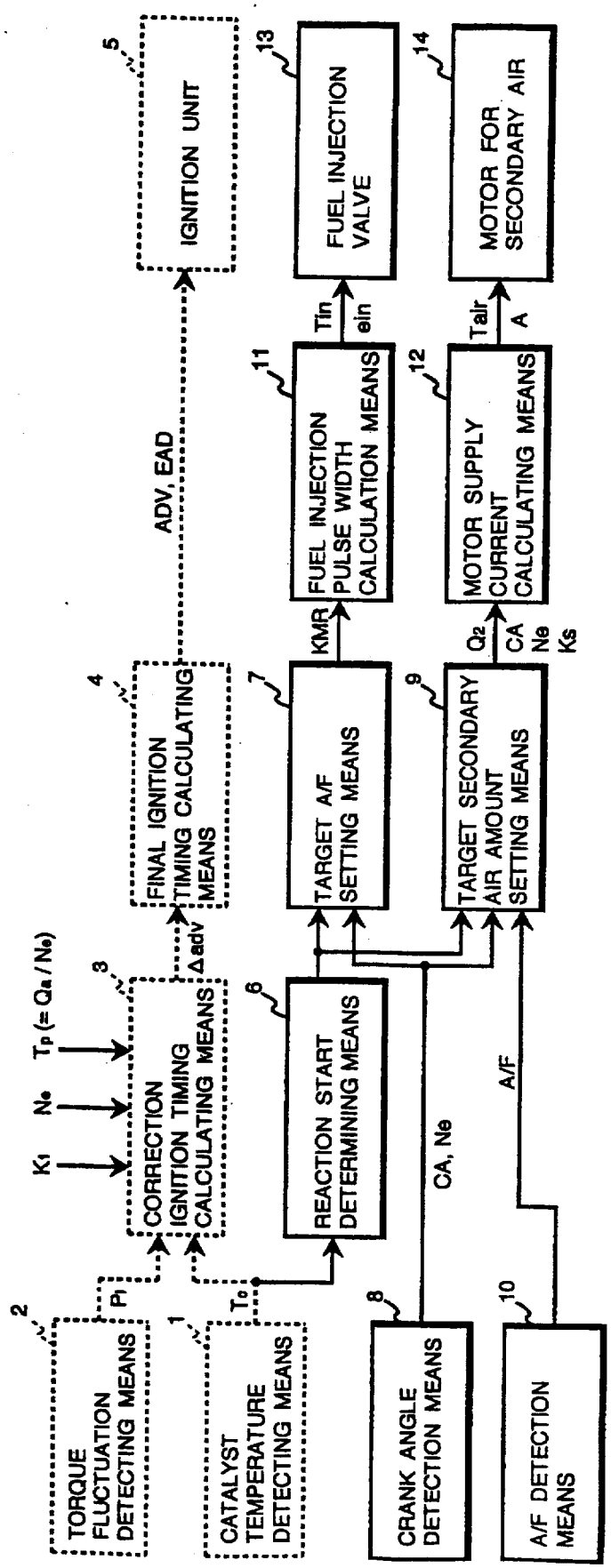
FIG. 2 is a block diagram showing the relationship in construction between the ignition timing control equipment, a secondary air control equipment and an air/fuel ratio control equipment used in the engine system of the present invention.

First, the concept of a method of warming up fast a catalyst will be explained with reference to FIG. 1. While a variety of input/output informations and signals are shown in FIGS. 1 and 2, these informations and signals are used just for explanation of the relationship with the engine system according to the present invention described later. Therefore, it is appreciated that they are not limited by the description.

The present invention intends to speed up the warming-up of the catalyst by using the reaction of clarification (the reaction of combustion) of CO produced in the catalyst as a heat source. Further, in the present invention, the retard of an ignition timing allows high-temperature exhaust gas to reach the catalyst. Furthermore, in the present invention, the control of the ignition timing is performed not only from the above point of view, but in consideration of the drivability (especially the torque of an engine).

The method of warming up fast the catalyst is performed by the combination of operations of catalyst temperature detecting means 1, torque fluctuation detecting means 2, correction ignition timing calculating means 3, final ignition timing calculating means 4 and ignition unit 5.

The catalyst temperature detecting means 1 detect or estimate the temperature of the catalyst, and output the detected or estimated result to the correction ignition timing calculating means 3.

In parallel with this, the torque fluctuation detecting means 2 detect the state of the fluctuation of the torque of the engine, and output the detected result to the correction ignition timing calculating means 3.

The correction ignition timing calculation means 3 determine a correction ignition timing for the catalyst warming-up or the correction amount of retard (þadv). The correction ignition timing is determined not only in consideration of the fast warming-up of the catalyst, but the reduction of the fluctuation of the torque of the engine. It is possible to reduce the fluctuation of the torque by feeding back an input signal from the torque fluctuation dectecting means 2. The correction ignition timing can be stored in advance in a ROM (Read only Memory) as a map. It is, therefore, possible to determine the correction ignition timing by comparing the data stored in the map with the detected result of the torque fluctuation detecting means 2.

The final ignition timing calculating means 4 calculate a final ignition timing (ADV) by using a normal ignition timing set in accordance with operation parameters of the engine, and output the result to an ignition unit 5. The ignition unit 5 performs the igniting operation at the final ignition timing.

Next, another method of warming-up faster the catalyst will be explained with reference to FIG. 2, in which the control of an air/fuel ratio (A/F) and the secondary air inducement are also performed.

Where, the A/F control is performed to speed up the production of CO, and the secondary air control is used to burn efficiently CO.

In FIG. 2, the same portions (the portion corresponding to the control of a retard ignition timing) as FIG. 1 is shown in a dotted line. Therefore, only the portion shown in a solid line will be explained hereinafter.

The catalyst temperature detecting means 1 output the result also to a reaction start determining means 6.

The reaction start determining means 6 determine whether or not the temperature of the catalyst reach the temperature (the catalyst is at temperatures of 120 to 130° C.) at which the clarification (combustion reaction) of CO (Carbon Monoxide) is performed. The result of determination is output to a target A/F setting means 7 and a target secondary air setting means 9, in order to determine whether or not the A/F control and the secondary air inducing control are substantially performed.

Figure 3:
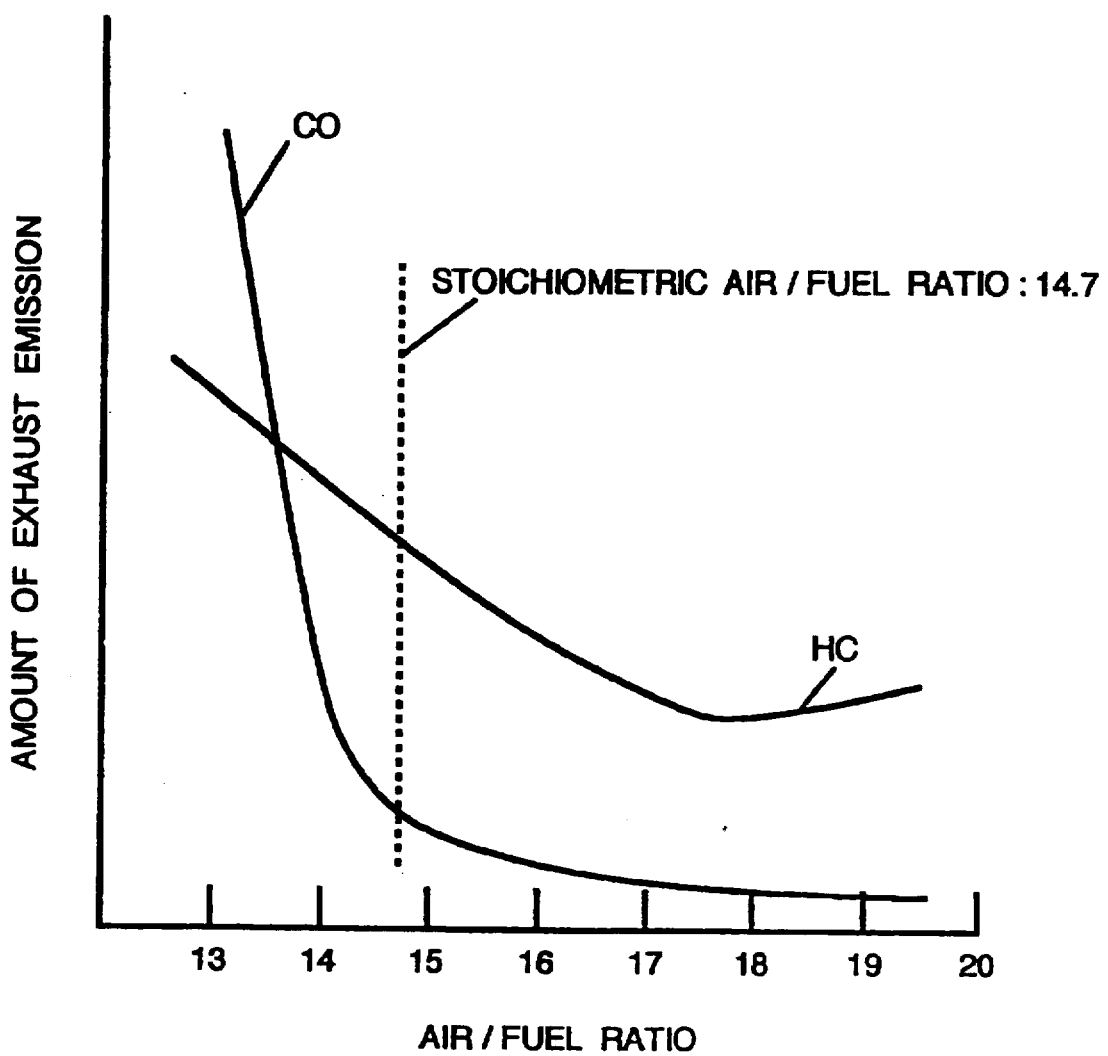
FIG. 3 is a graph showing the characteristic of emissions of hydrogen carbon (HC) and carbon monoxide (CO).
Figure 4:
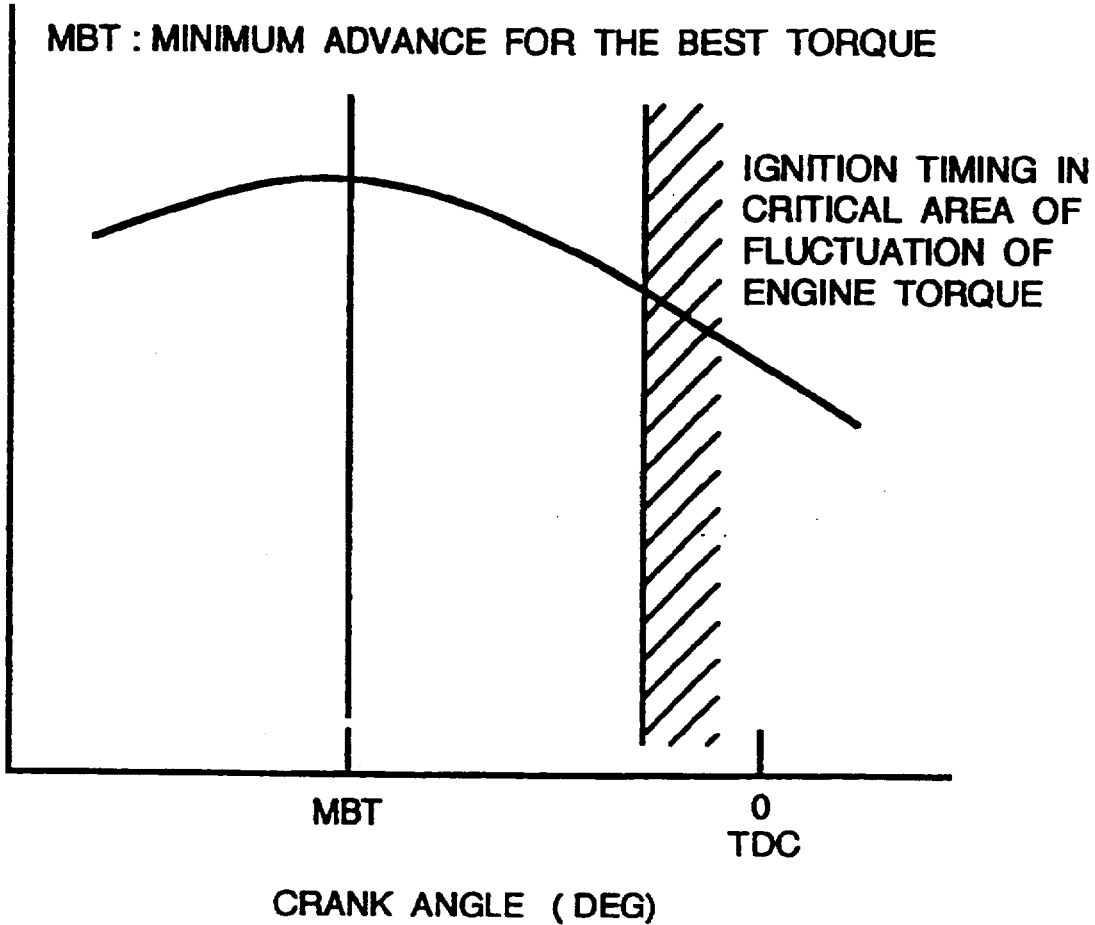
FIG. 4 is a graph showing the relationship between an ignition timing and combustion efficiency.
Figure 5:
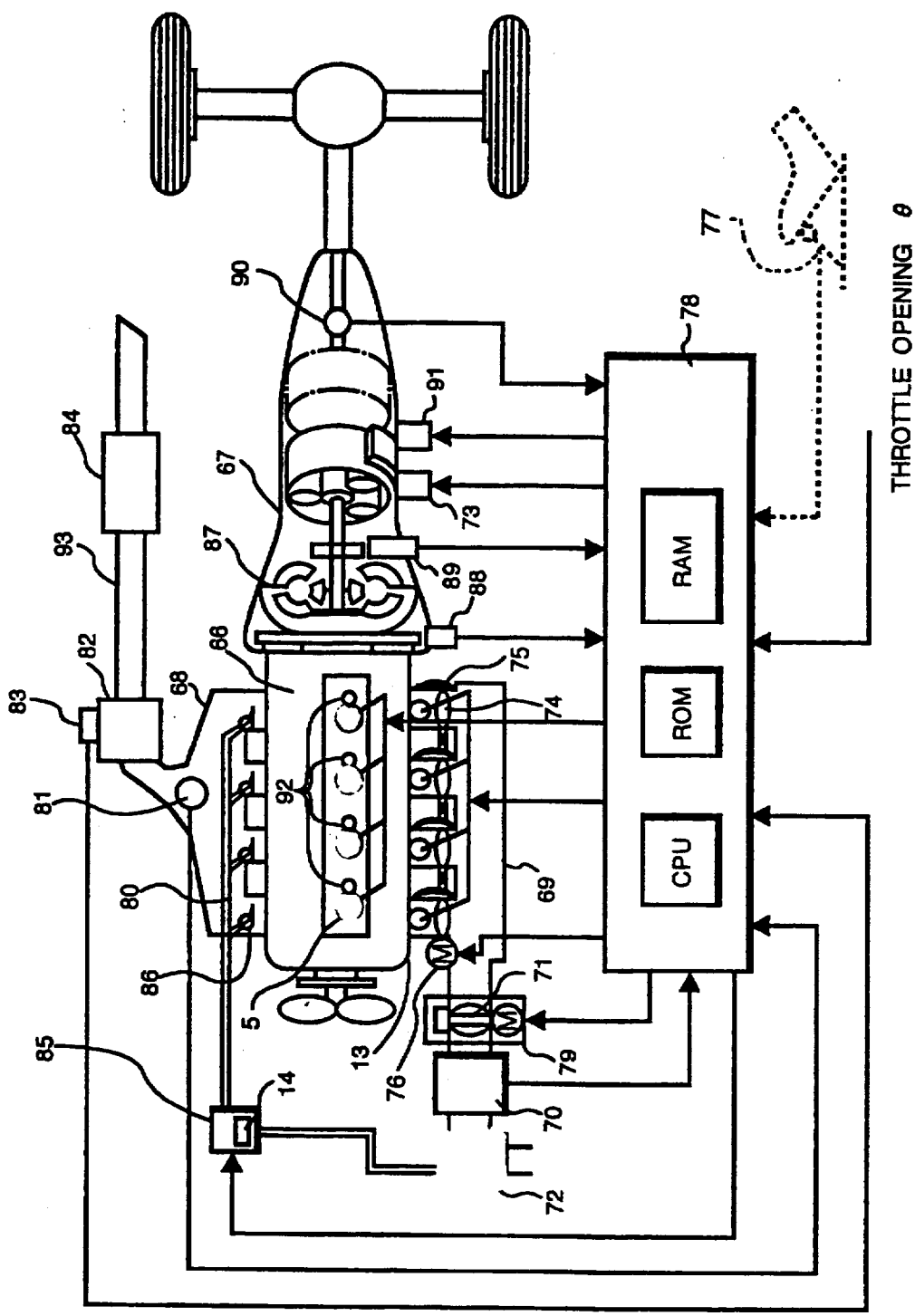
FIG. 5 is a schematic view of the engine system according to the present invention.

As shown in FIG. 3, a large amount of CO are emitted from the engine under the condition in which the A/F of air mixture supplied to the engine is smaller than the stoichiometric point, 14.7, that is, the fuel is in a rich state. The maximum efficiency of the clarification of CO can be obtained under the condition in which the rate of excess air in a catalyst converter is around 1.2. Accordingly, it is essential to perform the A/F control and the secondary air inducing control to exhaust gas in accordance with the temperature of the catalyst. Where, the secondary air is the air introduced into the exhaust gas between the catalyst converter and the engine.

While the reaction start determining means 6 determine whether or not the temperature of the catalyst reach the temperature at which the clarification can be performed, it is also possible to determine it by calculating that the temperature (Tc) of the catalyst can reach the temperature of 120° C. after what seconds, on the basis of the following equation (1) and the relationship between the ignition timing adv and the combustion efficiency η.

$$M \cdot Cc \cdot dTc/dt = (1-\eta) \cdot Hu \cdot Gf \quad (1)$$

where, M is mass of the catalyst, Cc is the specific heat, Tc is the temperature of the catalyst, η is the combustion efficiency of the engine, Hu is the heating value and Gf is the fuel amount.

In parallel with this, the crank angle detecting means 8 obtain the crank angle CA of the engine and the angular velocity of the crank (engine speed Ne), and output them to the target A/F setting means 7 and the target secondary air setting means 9.

The signal indicative of whether or not the temperature of the catalyst reach the temperature at which the reaction of CO can be occurred and the crank angle signal of the engine detected by crank angle detecting means 8, are input to the target A/F setting means 7.

The target A/F setting means 7 determine the A/F setting coefficient by referring to the map indicative of the relationship between the engine speed and the load of the engine (the air amount Qa/ the engine speed Ne). Further, the target A/F setting means 7 determine the start time of change in the A/F on the basis of the start time of the reaction of CO and the crank angle. Then, the target A/F setting means 7 output the determined the A/F setting coefficient to fuel injection pulse width calculating means 11 at the determined start time of the change. The fuel injection pulse width calculating means 11 calculate the width of the fuel injection pulse sufficient to realize the target A/F, and output it to a fuel injection valve 13 in order to obtain a motor supply current matched to the width of the fuel injection pulse. The fuel injection valve 13 injects the fuel amount corresponding to the motor supply current. Thereby, it become possible to control the A/F of air mixture supplied to the engine to such a value that the concentration of CO in the exhaust gas is increased.

In parallel with the above control, the control of the secondary air flow is also performed.

Target secondary air amount setting means 9 obtain the timing of control start of a motor for the secondary air on the basis of the start time of the reaction of CO and the crank angle, and the following model for inducing the secondary air flow.

$$Q_2 = (14.7 \cdot 1.2) \cdot Gf - Qa \quad (2)$$

Where, $Q_2$ is the secondary air flow, Qa is the intake air amount of the engine, 14.7 is the stoichiometric point, and 1.2 is the rate of excess air.

The target secondary air amount setting means 9 output the signal indicative of the target secondary air flow to motor supply current calculating means 12 at the start timing of the motor control. The motor supply current calculating means 12 obtain a motor current corresponding to the target secondary air flow or air amount, and output it to a motor 14 for the secondary air. Thereby, it is possible to keep the rate of excess air in the catalyst converter to the value suitable to the combustion of Co.

Next, an engine system according to the present invention will be explained hereinafter.

An internal combustion engine 66 is a lean-burn engine in which the rate of mixture of air and fuel is relatively large, a direct injection engine in which the fuel is directly injected to cylinders of the engine, or an engine with the stoichiometric A/F point. An automatic transmission 67, an exhaust manifold 68, an intake pipe 69 and the ignition unit 5 are mounted on the engine 66. In the intake pipe 69, there are provided an air sensor 70 for detecting an air amount, a throttle valve 71, a heater 72 for heating the air to introduce the secondary air to the manifold 68, and the fuel injection valve 13. In order to improve the mixed condition of air and fuel, there are also provided a by-pass type valve 74, intake passage 75 and a drive motor 76 for the by-pass type valve in the intake pipe 69. In the case that the throttle opening is controlled electrically by inputting a signal from an accelerator pedal angle sensor 77 to a control unit 78, an electrically controlled throttle 79 is provided in the intake pipe 69.

In the manifold 68, there are provided a secondary air inducing pipe 80, an A/F sensor 81 and a close-coupled three way catalyst 82 every cylinders. A temperature sensor 83 is provided on the catalyst 82. An exhaust pipe 93 is mounted behind the catalyst 82. The exhaust pipe 93 has a main three way catalyst 84. Further, a motor-contained pump and a one-way valve 86 for preventing a counter flow of the exhaust gas are provided in the secondary air inducing pipe 80. In the transmission 67, there are provided an input/output shaft rotation sensors 88, 89 for a torque converter 87 and a vehicle speed sensor 90. When signals from these sensors are input to the control unit 78, the catalyst warming-up control is performed. Then, drive signals each is output to each of the ignition unit 5, the fuel injection valve 13, the pump 85 containing the motor 14, the motor 76 for driving the by-pass valve, speed-change solenoid 73 and an oil pressure controlled solenoid 91.

A cylinder pressure sensor 92 detects the internal pressure of each of combustion chambers, and output them to the control unit 78.

The control unit 78 is comprised of a program required to perform the various controls, a CPU for running the program, and other electronic circuits. The detected results of the various sensors are input to the control unit 78. By processing those input data according to the program, instructions to each portions of the engine system are determined.

In the system shown in FIG. 2, the temperature sensor 83 corresponds to the catalyst temperature detecting means, and the cylinder pressure sensor 92 and the control unit 78 correspond to the torque fluctuation detecting means 2. Further, the input/output shaft rotation sensor 88 corresponds to the crank angle detecting means 8, and the A/F sensor 81 corresponds to the A/F detecting means 10 (exhaust gas condition detecting means in claims). Futhermore, the control unit 78 corresponds to the correction ignition timing calculating means 3, the final ignition timing calculating means 4, the reaction start determining means 6, the target A/F setting means 7, the target secondary air setting means 9, the fuel injection pulse width calculating means 11 and the motor supply current calculating means 12.

While the temperature sensor 83 is used as the catalyst temperature detecting means in the above embodiment, it is possible to use the catalyst model expressed by the equation (1) instead. If a HC sensor or a CO sensor is used instead of the A/F sensor, it becomes possible to control the A/F more precisely and shorten the catalyst warming-up time. It is possible to detect the fluctuation of torque by detecting the cylinder pressure, the fluctuation of rotation frequency, the torque of a shaft, etc.

The operation of the faster catalyst light-off will be explained with reference to FIGS. 6 to 9 and FIG. 10.

FIGS. 6 to 9 each is a flow chart showing the operation of the control unit 78 in the ignition timing control.

Figure 6:
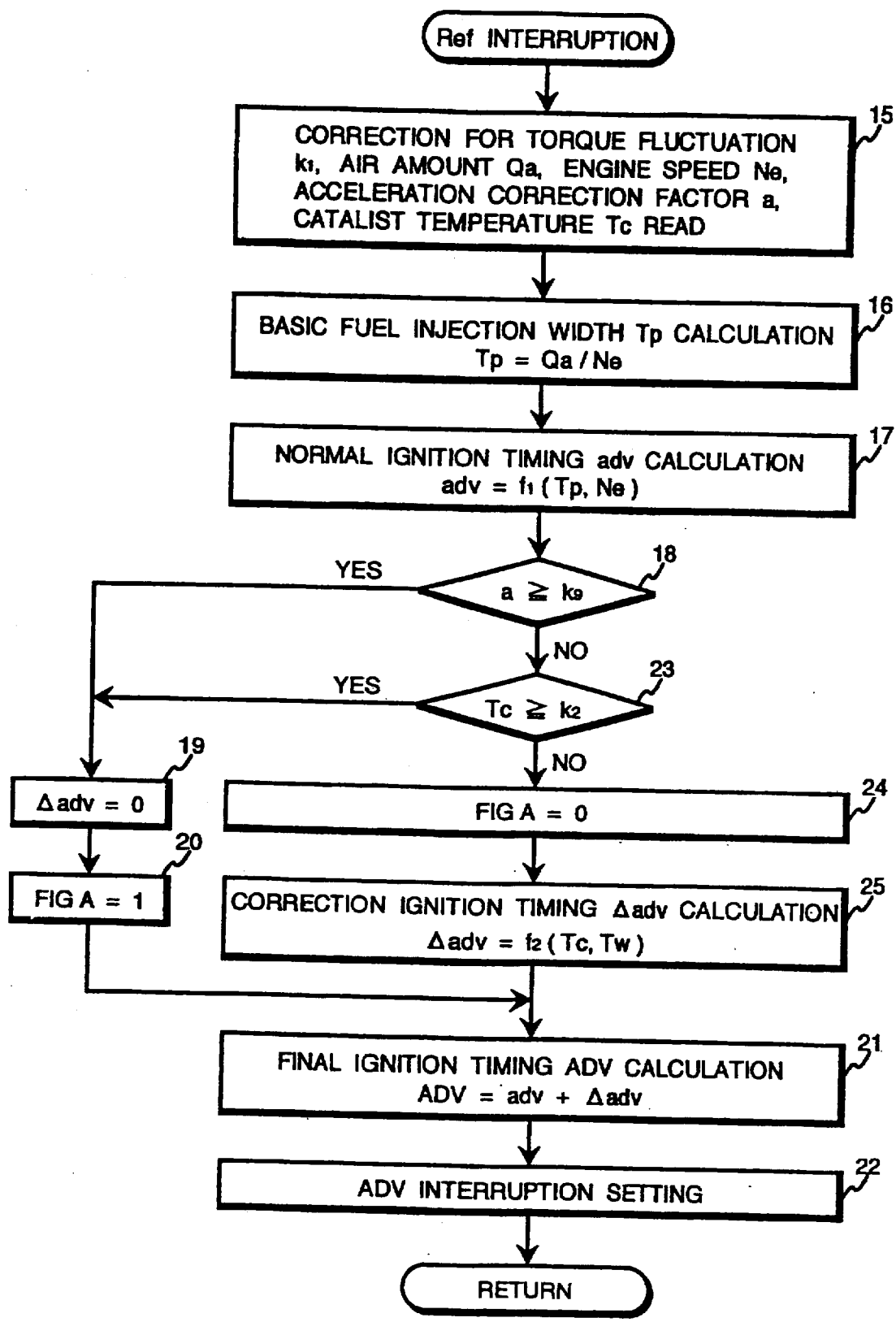
FIG. 6 is a flow chart illustrating the processing of the ignition timing control.

The processing shown in FIG. 6 is performed interruptly with reference to a Ref signal generated at a constant crank angle every cylinders of the engine.

When the rise of the Ref signal from the input/output shaft rotation sensor 88 is detected by the control unit 78, the control unit starts the processing shown in FIG. 6. After that, the control unit 78 obtains a correction value k1 for the fluctuation of torque, an air amount Qa, an engine speed Ne, a catalyst temperature Tc, and a correction factor a for acceleration obtained by using the rate of change of the throttle opening, etc., on the basis of outputs from various sensors mounted at various positions of the engine (step 15). Where, the correction value k1 for the fluctuation of-torque is obtained by the processing shown in FIG. 9, and the acceleration correction factor a is change rate of the throttle opening $\theta$ (d$\theta$/dt) calculated by the control unit 78 itself.

Next, the control unit 78 calculates basic fuel injection width Tp (=Qa/Ne) by using the air amount Qa and the engine speed Ne (step 16). Further, when the reduction control of the torque of the engine is not performed, a normal ignition timing adv is obtained by using the function f1 (step 17). The function f1 has basic fuel injection width Tp and the engine speed Ne as parameters.

After that, the processing advances to step 18. In step 18, whether or not a driver desires to accelerate fast a vehicle is determined on the basis of a large and small relationship between the acceleration correction factor a and an acceleration determination constant kg. Where, the acceleration determination constant kg is a reference value with respect to how fast the drive steps down the accelerator pedal. By using the constant kg, it is possible to determine whether the driver is requesting fast acceleration or slow acceleration. The constant kg is stored in advance in the memory of the control unit 78.

As a result of the determination, the acceleration correction factor a is smaller than the acceleration determination constant kg, the processing advances to step 23. In step 23, it is determined whether or not the catalyst temperature Tc is larger than the reaction temperature $k_2$ of HC (about 380° C.).

As a result of the determination in step 23, If the catalyst temperature Tc is smaller than the temperature $k_2$, then, it is determined that the engine is during warming-up and the processing advances to step 24. In step 24, FlgA is set to 0. Where, FlgA is used in the flow chart of FIG. 8 in order to determine the state of the control of the warming-up of the catalyst. If FlgA =0, then the detection of the fluctuation of torque shown in FIG. 9 is performed. After that, the correction ignition timing$\Delta$ adv is obtained by using the function $f_2$ and the correction value $k_1$ for the fluctuation of torque in step 25. Where, the function $f_2$ has the catalyst temperature Tc and the water temperature Tw as parameters.

While, if the acceleration correction factor a is larger than the acceleration determination constant kg (that is, if fast accerleration is desired) in step 18, or if the catalyst temperature Tc is smaller than the reaction temperature $k_2$ of HC (that is, if the catalyst temperature is so low that even combustion reaction of CO is not occurred), then the processing advances to step 19. In step 19, the correction ignition timing þadv is set to 0. This is because the drivability (the acceleration feeling in this case) is more important than the faster catalyst light-off, and because the catalyst is not heated even if CO is produced due to the retard of the ignition timing in the case that the catalyst temperature is so low that the combustion reaction of CO can not be occurred. Then, in order to prohibit the control of the catalyst warming-up, 1 is substituted into FIG. A in step 20.

After the completion of the step 20 or 25, the processing advances to step 21 and then step 22 in which the control of the retard of the ignition timing is performed. Namely, the final ignition timing ADV (=adv +Δ adv) is obtained in step 21, and then the interruption setting is performed at the final ignition timing ADV in step 22. If the processing arrived at step 21 via step 20, the control of the retard of the ignition timing is not substantially performed, because of Δ =0.

Next, ADV interruption processing will be explained with reference to FIG. 7.

Figure 7:
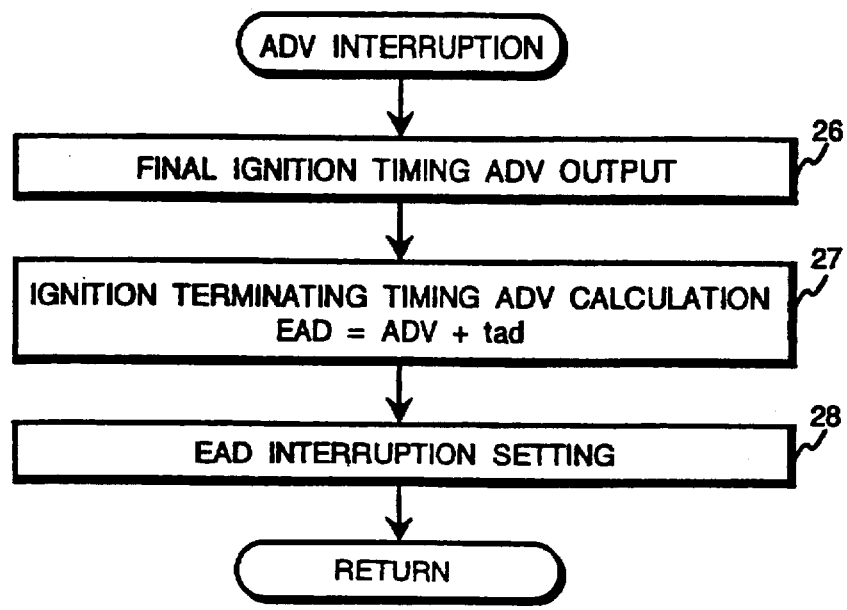
FIG. 7 is a flow chart illustrating the processing of an ADV interruption.

The interruption processing shown in FIG. 7 is set in step 22 of FIG. 6. After the start, the control unit 78 outputs the final ignition timing ADV to the ignition unit 5 in step 26, and the ignition-completion timing EAD is calculated in step 27. Namely, the sum of the final ignition timing ADV and a constant tad of current-passing time is obtained in step 27. Then, EAD interruption is set in step 28.

Next, EAD interruption processing will be explained with reference to FIG. 8.

Figure 8:
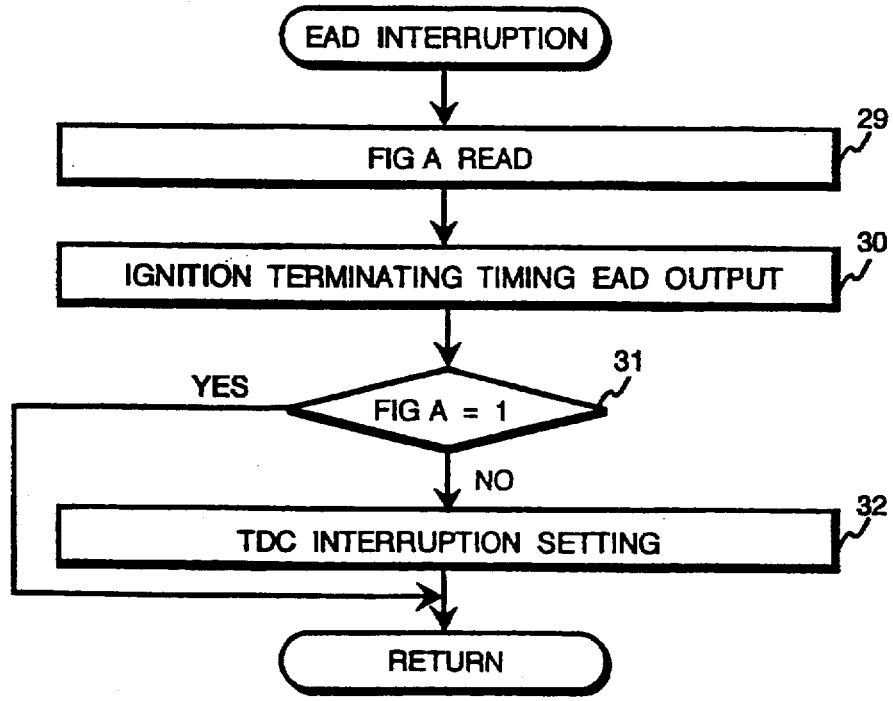
FIG. 8 is a flow chart illustrating the processing of an EAD interruption.
Figure 9:
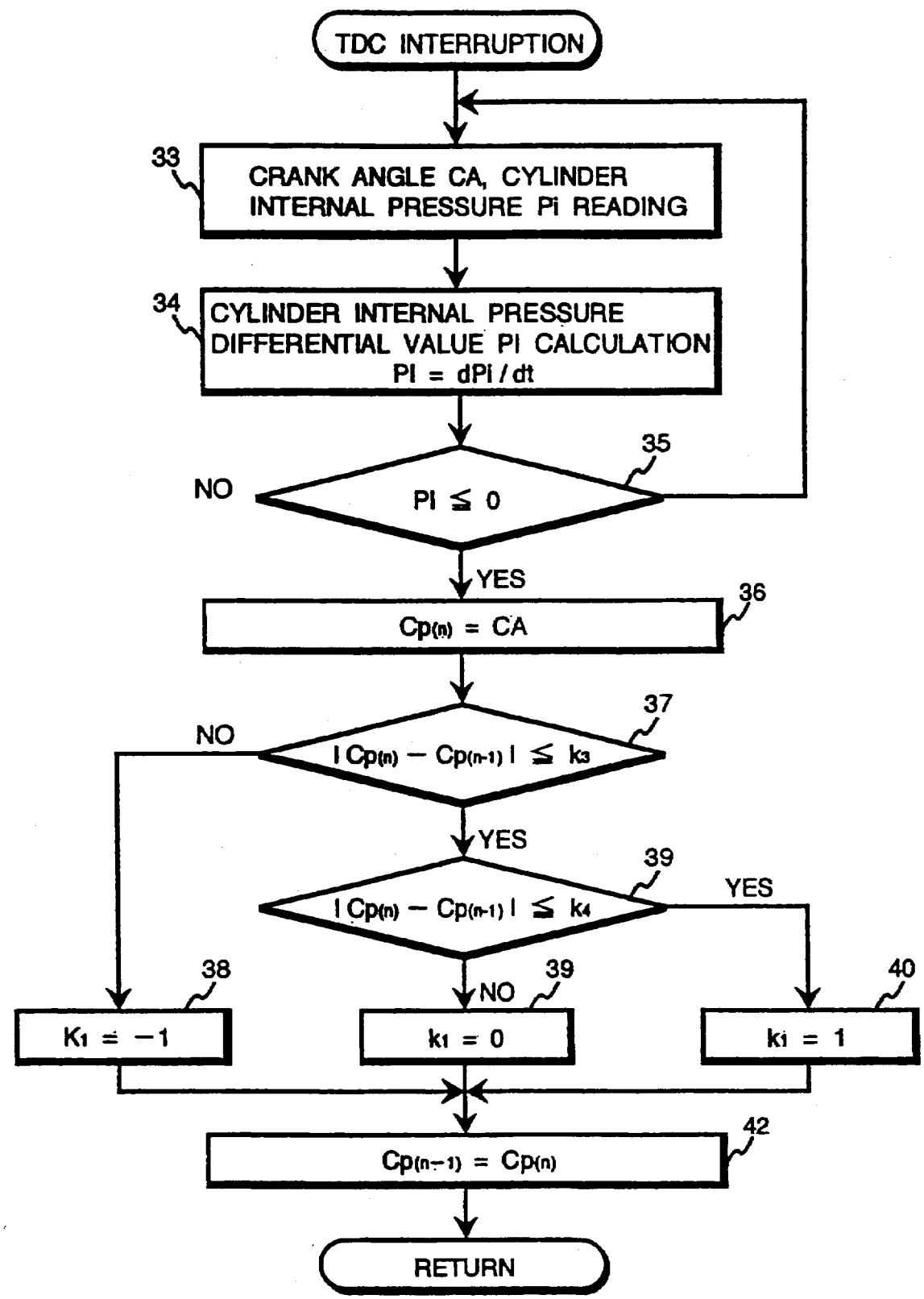
FIG. 9 is a flow chart illustrating the processing of an TDC interruption.

The interruption processing shown in FIG. 8 is set in step 28 of FIG. 7. After the start, the control unit 78 reads the FlgA. In step 30, the final ignition timing EAD and the ignition completion timing EAD is output to the ignition unit 5. Next, it is determined whether FIG. A equals to 1 in step 31. Namely, the content of control of the ignition timing is determined in step 31.

As a result of the determination, if not FlgA =1, that is, if the control of the retard of the ignition timing is performing, then the processing advances to step 32, and the TDC interruption processing at the upper end is set in step 32. This processing is performed to detect the state of the fluctuation of the torque caused by the control of the retard of the ignition timing.

While, if FlgA =1, that is, if the control of the normal ignition timing is performing, then the processing is returned as it is.

Next, the TDC interruption processing at the upper end will be explained with reference to FIG. 9.

The TDC interruption processing at the upper end is performed to detect the torque fluctuation of an engine. In this embodiment, it is determined by detecting the crank angle in which a waveform of the cylinder pressure Pi reaches its peak, and examining the extent of variations in the crank angle every times.

The processing is set in step 32 of FIG. 8. After the start, the control unit 78 reads the crank angle CA and the cylinder pressure Pi from sensors mounted on each position in step 33. Then, the differential value PI of the cylinder pressure Pi is calculated in step 34. After that, it is determined whether or not the differential value PI obtained in step 34 is smaller than 0, that is, whether or not the cylinder pressure Pi reaches its peak in step 35. If it dose not reach its peak, then the processing is returned to step 33 and the same processing is repeated.

While, if the cylinder pressure Pi reaches its peak in step 35, then the processing advances to step 36, in which the crank angle CA at that time is stored in the memory value Cp(n) for the current crank angle. Then, it is determined whether or not the absolute value of difference between the memory value Cp(n) and the previous value Cp(n-1) is smaller than a first torque fluctuation detecting constant $k_3$ in step 37. Where, the first torque fluctuation detecting constant $k_3$ and a second torqu fluctuation detecting constant $k_4$ described later is stored in advance in a memory of the control unit 78.

As a result of the determination, if the above absolute value (=| Cp(n) −Cp(n−1)| ) is larger than the first torque fluctuation detecting constant $k_3$, then the processing advances to step 38, in which −1CA (deg) is input into the correction value $k_1$ for the fluctuation of torque (see FIG. 6). Thereby, the ignition timing is advanced, and thus the fluctuation of the torque is improved. Where, the magnitude of the correction value is obtained in advance by using a matching method or a model for the ignition timing control.

While, if the above absolute value (=| Cp(n)−Cp(n−1)| ) is smaller than the first torque fluctuation detecting constant $k_3$, then the processing advances to step 39, in which it is determined whether or not the above absolute value is smaller than the second torque fluctuation detecting constant $k_4$.

As a result of the determination in step 38, if the above absolute value is smaller than the second torque fluctuation detecting constant $k_4$, then the torque fluctuation is little occurred. Therefore, the control unit 78 determines that it is possible to retard further the ignition timing. Then, 1CA (deg) is input into the correction value $k_1$ for the fluctuation of torque in step 40.

While, as a result of the determination in step 39, if the above absolute value (=| Cp(n)−Cp(n−1) | ) is larger than the first torque fluctuation detecting constant $k_4$ then it is determined that the ignition timing at that time is compatible in operation with the faster catalyst light-off, and the processing advances to step 39. In step 39, 0 is input into the correction value $k_1$ for the fluctuation of torque.

After the completion of step 38, 40 or 41, the current Cp(n) is input into Cp(n−1) in step 42. Then, the processing is returned.

Figure 10:
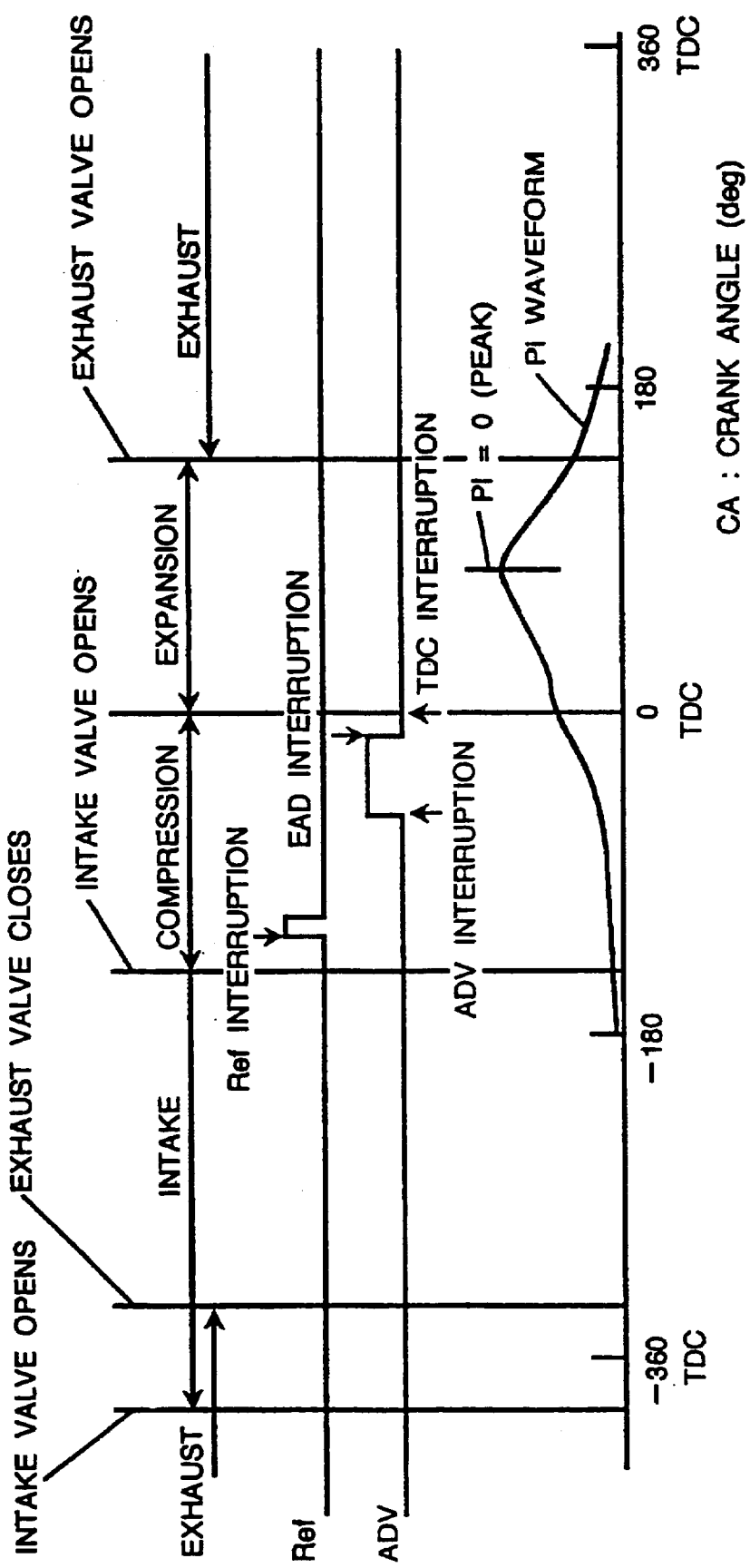
FIG. 10 is a time chart of the ignition timing control with respect to a crank angle of an engine.

Referring now to FIG. 10, there is shown a time chart showing Ref signal, ADV signal and Pi waveform when the control described with reference to FIGS. 6 to 9. Generally, the Ref signal is generated at 120 deg CA before TDC at which the compression process is completed. The ignition timing is set on a basis of the timing at which the Ref signal is generated, and is retarded. The cylinder pressure Pi allow its peak to drop and the crank angle is retarded. The compression process at that time is in the middle of the whole process. Therefore, it is possible to detect the state of the torque fluctuation by monitoring the peak value of the Pi waveform.

The control of the secondary air flow and the control of the A/F will be explained hereinafter.

Figure 13:
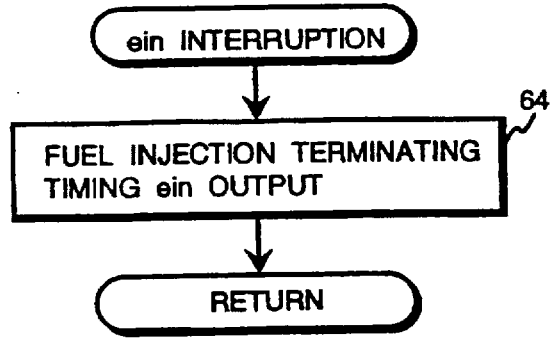
FIG. 13 is a flow chart illustrating the processing of an ein interruption.
Figure 14:
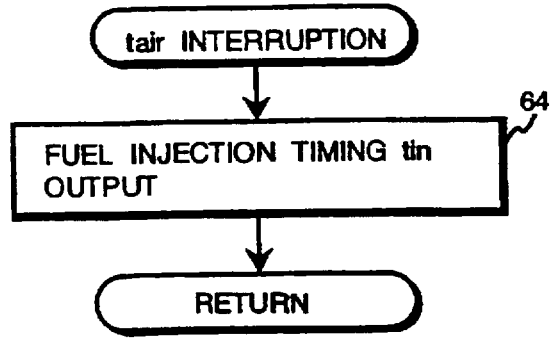
FIG. 14 is a flow chart illustrating the processing of an tair interruption.
Figure 15:
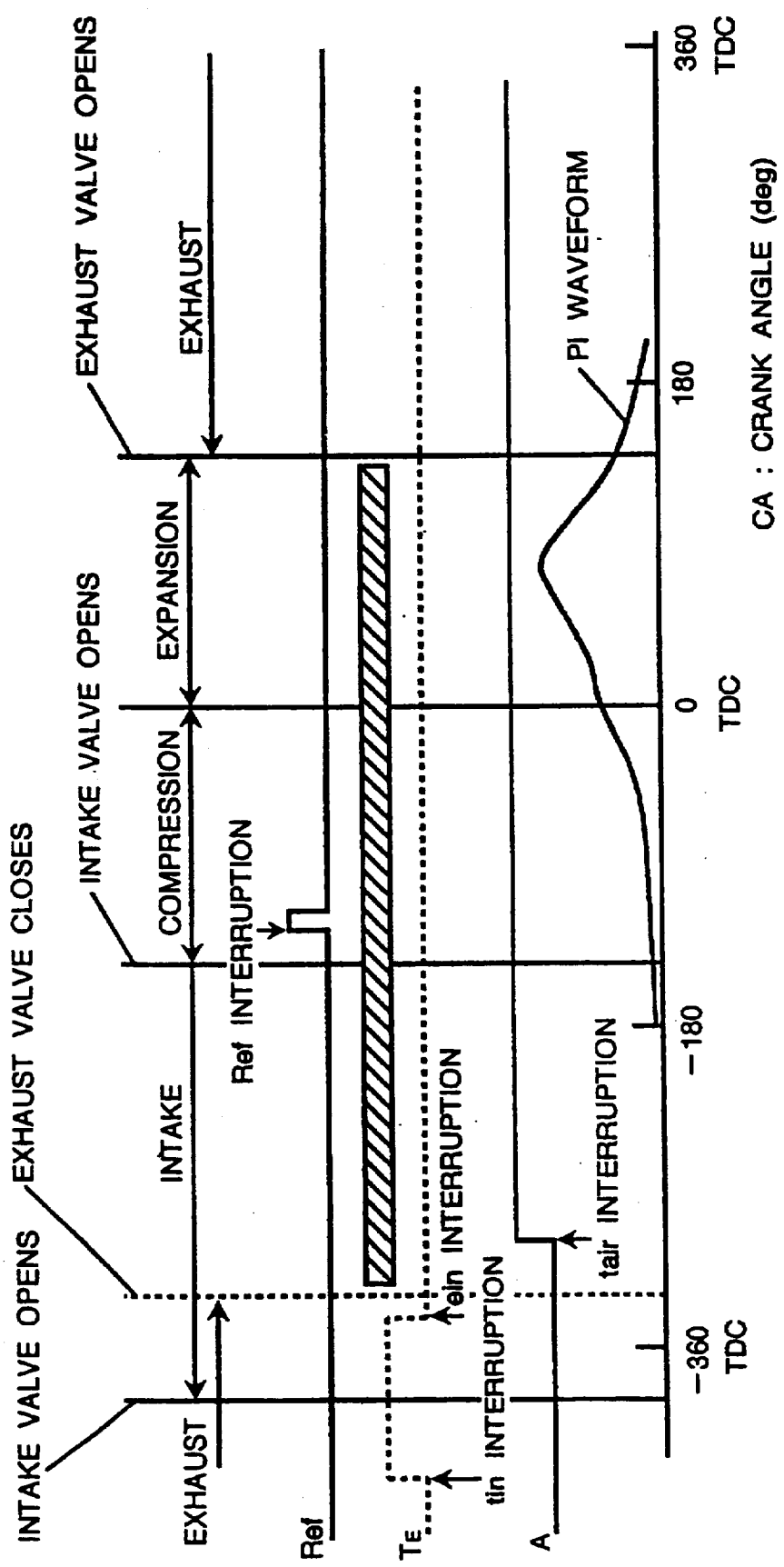
FIG. 15 is a time chart of the ignition timing control with respect to a crank angle of an engine.

FIGS. 11 to 14 each is a flow chart which the control unit 78 executes, and FIG. 15 is a time chart showing the control of the secondary air flow.

Figure 11:
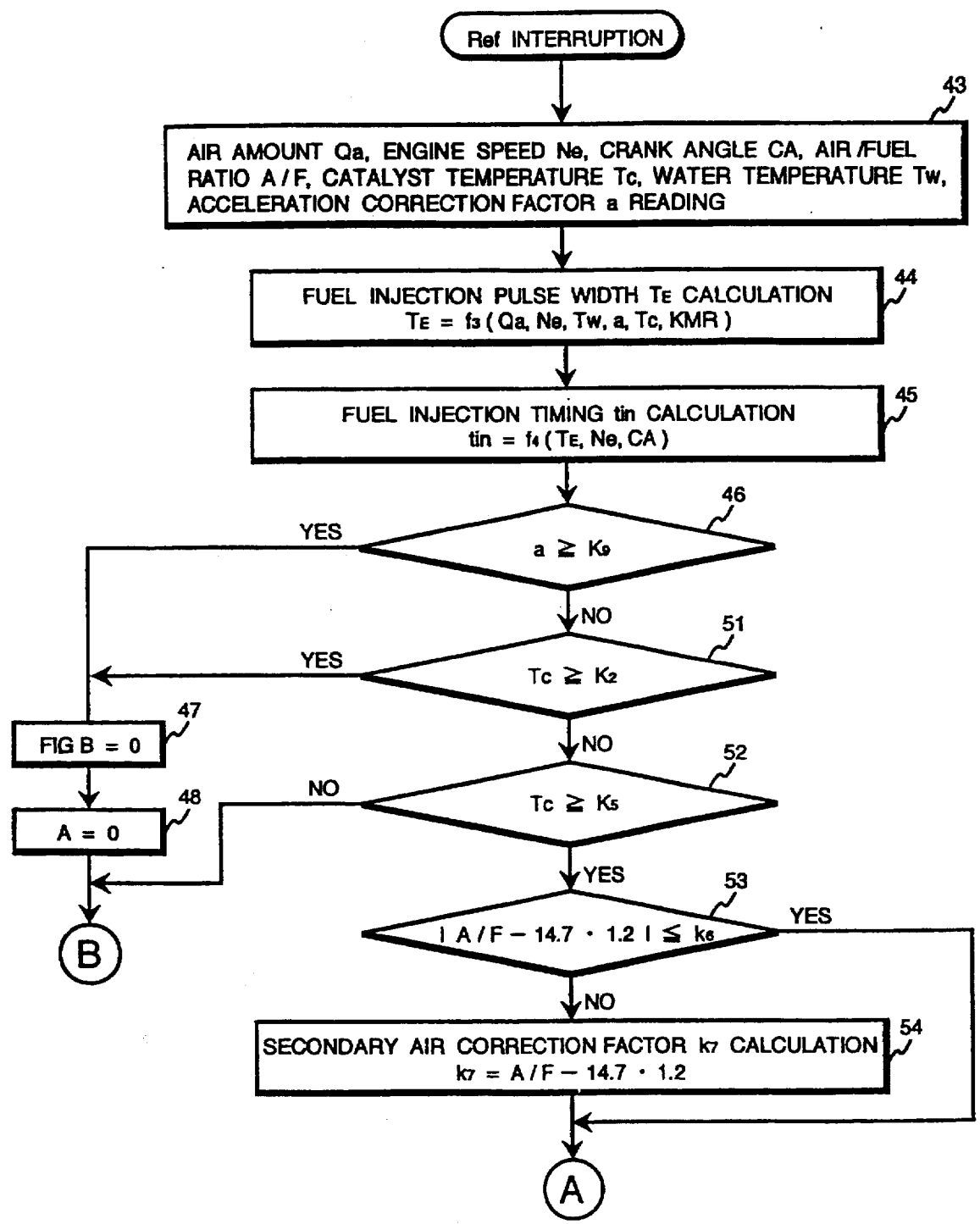
FIG. 11 is a flow chart illustrating the processing of the secondary air control.

The processing shown in FIG. 11 is performed interruptly with reference to the Ref signal. The control unit 78 starts the processing shown in FIG. 11 when it detects the rise of the Ref signal from the input/output shaft rotation sensor 88. After the start, the control unit 78 obtains the air amount Qa, the engine speed Ne, the crank angle CA, the air/fuel ratio A/F, the water temperature Tw of the engine coolant, the acceleration correction factor a and the catalyst temperature Tc on the basis of the outputs of various sensors mounted on each position of the engine (step 43). The control angle 78 calculates the fuel injection pulse width $T_E$ by using the function $f_3$ in step 44. The function $f_3$ has the air amount Qa, the engine speed Ne, the water temperature Tw, the acceleration correction factor A, and the catalyst temperature Tc as parameters.

Next, the control unit 78 calculates the fuel injection timing tin by using the function $f_4$ in step 45. The function $f_4$ has the fuel injection pulse width $T_E$, the engine speed Ne and the crank angle CA as parameters.

After the completion of step 45, it is determined whether or not the driver now requires fast acceleration on the basis of large and small relationship of the acceleration correction factor a as described above (step 46).

As a result of the determination, if the acceleration correction factor a is smaller than the acceleration determination constant $k_g$ (that is, if the fast acceleration is not required), the processing advances to step 51, in which it is determined whether or not the catalyst temperature Tc is larger than the temperature $k_2$ (about 380° C.) of the reaction of HC.

As a result of the determination in step 51, if the catalyst temperature Tc is smaller than the temperature $k_2$ of the reaction of HC, the processing advances to step 52, in which it is determined whether or not the catalyst temperature Tc is larger than the temperature $k_5$ (about 120° C.) of the reaction of CO.

As a result of the determination in step 52, if the catalyst temperature Tc is larger than the temperature $k_5$ (about 120° C.) of the reaction of CO, the processing advances to step 53. Namely, if the catalyst temperature Tc is the temperature Tc is larger than the temperature $k_5$ (about 120° C.) of the reaction of CO and smaller than the temperature $k_2$ (about 380° C.) of the reaction of HC, then the processing advances to step 53.

In step 53, it is determined whether or not the absolute value of difference between the air/fuel ratio A/F of exhaust gas and the A/F of the secondary air flow of an optimum reaction of CO (14.7 to 1.2) is smaller than the control range $k_6$ of the A/F of the optimum emissions. As a result of the determination, the abosolute value is larger than the control range $k_6$ of the A/F of the optimum emissions, then the secondary air correction factor $k_7$ is obtained in step 54. Then, the processing advances to step 55. Where, the control range $k_6$ of the A/F of the optimum emissions is the control range most suitable for the combustion of CO in the catalyst, and is stored in advance in a memory. Further, the correction factor $k_7$ of the secondary air flow is used for obtaining such a secondary air amount that the A/F of the real exhaust gas falls within the optimum range.

If the absolute value is smaller than the control range $k_6$ of the A/F of the optimum emissions in step 53, then the processing advances directly to step 55. In step 55, the amount Gf of the fuel really supplied to the engine is calculated according to the function $f_5$ of the width $T_E$ of the fuel injection pulse.

Next, the correction value that allows the A/F of the exhaust gas flowed into the close-coupled three way catalyst 82 to fall within the control range of the A/F of the optimum emission is calculated according to the function $f_8$ which has the secondary air correction factor $k_7$ as parameters. Then, the target secondary air amount $Q_2$ is obtained by using the calculated correction value and the above equation (2) in step 56. After that, the value A of a motor drive current required to supply the target secondary air amount $Q_2$ is obtained on the basis of the function $f_6$ which has the target secondary air amount $Q_2$ in step 57.

The timing at which the secondary air are introduced, that is, the timing tair at which the motor is driven, is calculated according to the function $f_7$. Where, the function $f_7$ has the crank angle CA, the engine speed Ne, and the crank angle $k_8$ at which the exhaust valve is closed as parameters. The reason why such a calculation is carried out is that it allows the value of the motor current to reduce as small as possible. Namely, the exhaust pressure of the manifold provided every cylinders is low when the exhaust valve is closed (a hatched portion of FIG. 15). Therefore, it is possible to introduce the secondary air with small motor current in such a situation. In fact, the efficiency of the inducement of the secondary air relates not only to the crank angle, but also the position to induce from the exhaust pipe.

After the completion of step 53, it is determined whether or not FlgB equals to 1 in step 59. Where, FlgB is used for determining the state of drive of the motor for the control of the secondary air flow.

If FlgB does not equal to 1, that is, the motor is not drived yet, then the processing advances to step 60, in which the interruption of the motor drive timing tair is set. After that, 1 is substituted into FlgB in step 61. Then, the processing advances to step 49. While, if FlgB is 1 in step 59, or if the motor is already drived, then the processing advances directly to step 49.

In step 49, the width of the fuel injection pulse is stored in RAM. Then, the interruption of the fuel injection timing tin is set in step 50.

As a result of the determination in step 46, if the acceleration correction factor a is larger than the acceleration determination constant $k_g$ (namely, fast acceleration), the processing advances to step 47, in which 0 is substituted into FlgB and the drive of the motor for the control of the secondary air is prohibited. Then, the value A of the motor drive current is set to 0 in step 48. This is done for attaching importance to drivability (acceleration feeling in this case) rather than the faster catalyst light-off. After that, the processing advances to step 49 and then step 50, in which the output of the width $T_E$ of the fuel injection pulse and the interruption of the fuel injection timing tin are set.

Further, if the catalyst temperature Tc is smaller than the temperature $k_5$ (about 120° C.) of the reaction of CO, then the control unit 78 determines that even if the secondary air is introduced, the combustion of CO is not stimulated. Therefore, in this case, steps 47 to 50 are performed and the secondary air is not introduced (see step 53 to 61).

If the catalyst temperature Tc is larger than the temperature $k_2$ (about 380° C.) of the reaction of HC, then the control unit 78 determines that the warming-up of the catalyst is completed. Therefore, also in this case, only steps 47 to 50 are performed and the secondary air is not introduced.

Next, tin interruption processing will be explained with reference to FIG. 12.

The tin interruption processing is set in step 50 of FIG. 11. After the start of the tin interruption processing, the control unit 78 calculates the terminating timing ein of the fuel injection in step 62. Namely, the fuel injection timing tin is added to the width $T_E$ of the fuel injection pulse and the result of the addition is set to as the fuel injection terminating timing ein.

Next, ein interruption processing will be explained with reference to FIG. 13.

Figure 12:
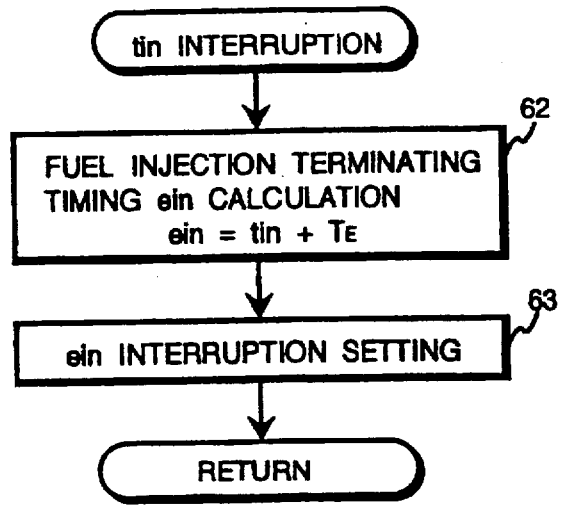
FIG. 12 is a flow chart illustrating the processing of an tin interruption.

The ein interruption processing is set in step 63 of FIG. 12. After the start of the ein interruption processing, the control unit 78 outputs the terminating timing ein of the fuel injection to the fuel injection valve 13 in step 64. Then the processing is returned.

Next, tair interruption processing will be explained with reference to FIG. 14.

The tair interruption processing is set in step 60 of FIG. 11. After the start of the tair interruption processing processing, the control unit 78 outputs the fuel injection timing tin in step 65. Then, the processing is returned. In such a way, the control of the secondary air flow and the control of rich mixture are performed according to the temperature of the catalyst.

Figure 16:
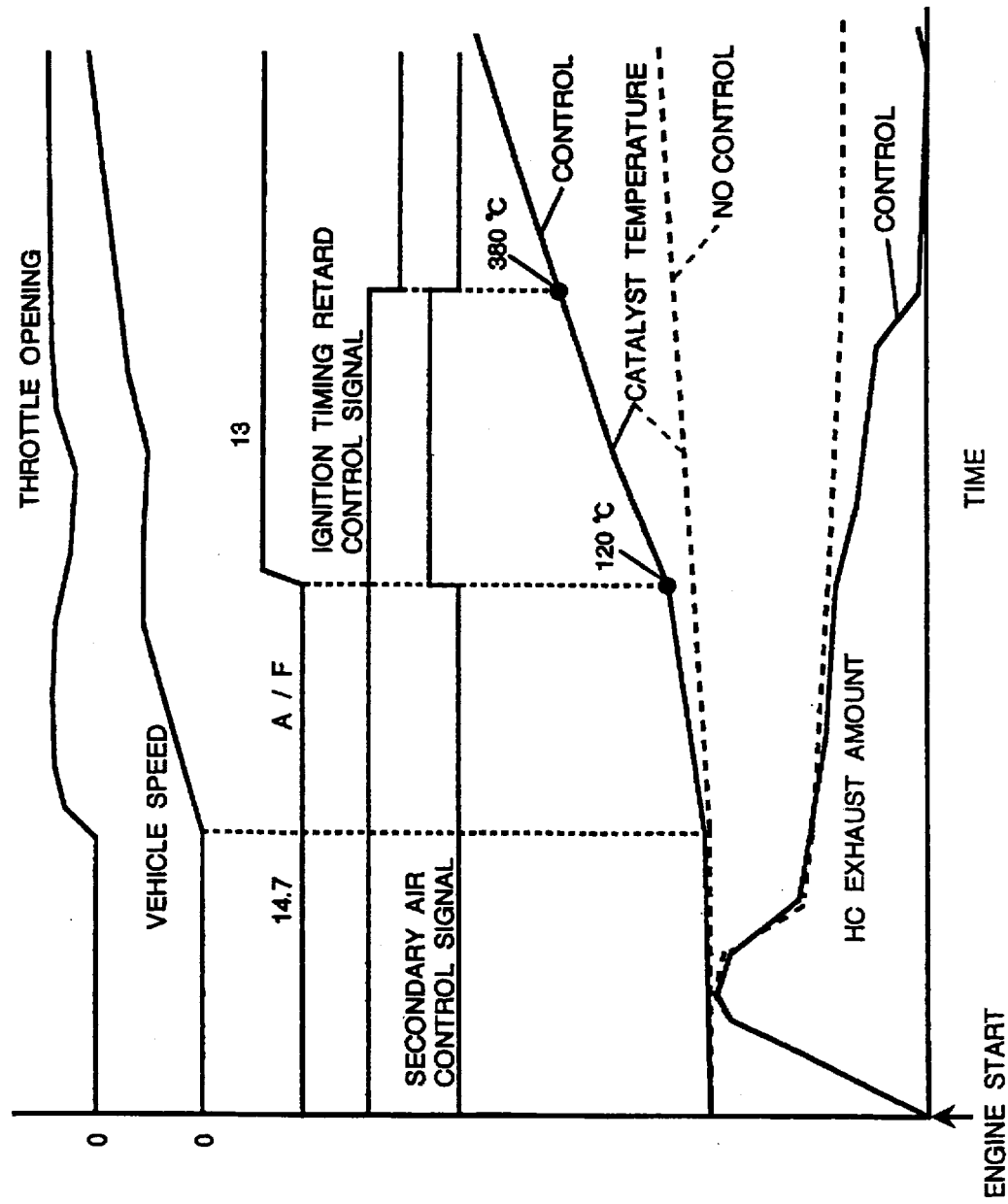
FIG. 16 is a time chart illustrating the increasement of the temperature of a catalyst, an emission amount of a harmful material, etc. in which a method of warming up fast the catalyst is used.

FIG. 16 is a time chart illustrating the increasement of the temperature of a catalyst, an emission amount of a harmful material, etc. These characteristics are obtained by using a method, that is, the faster catalyst light-off method.

In FIG. 16, after the start of the engine, the engine is in a idling state. After that, the throttle is opened and thus the speed of a vehicle is increased. The solid line designates the control state to which the present invention is applied. To compare with the prior art, the control state to which the present invention is not applied is designated by the dotted line.

In the ildling state, the temperature of the catalyst is low, and therefore, the amount of HC emissions is increasing. In the control state to which the present invention is not applied, the catalyst is warmed up according to the extent of warming-up of the engine. Therefore, the rate of increasement of the temperature of the catalyst is relatively slow.

On the contrary, in the control state to which the present invention is applied, that is, the control of the retard of the optimum ignition timing and the control of the secondary air flow is performed, the temperature of the catalyst is warmed up fast according to the extent of the speed-up of the vehicle as shown by the solid line. Further, after the temperature of the catalyst is beyond 120 C., the air/fuel ratio becomes rich. Therefore, the increased CO is effectively reacted to the secondary air, and thus the rate of the increasement of the temperature of the catalyst becomes higher. Accordingly, the amount of the HC emissions is decreased.

In the clutch of the current automatic transmission, the oil pressure to engage the clutch is determined according to the throttle opening.

Figure 17:
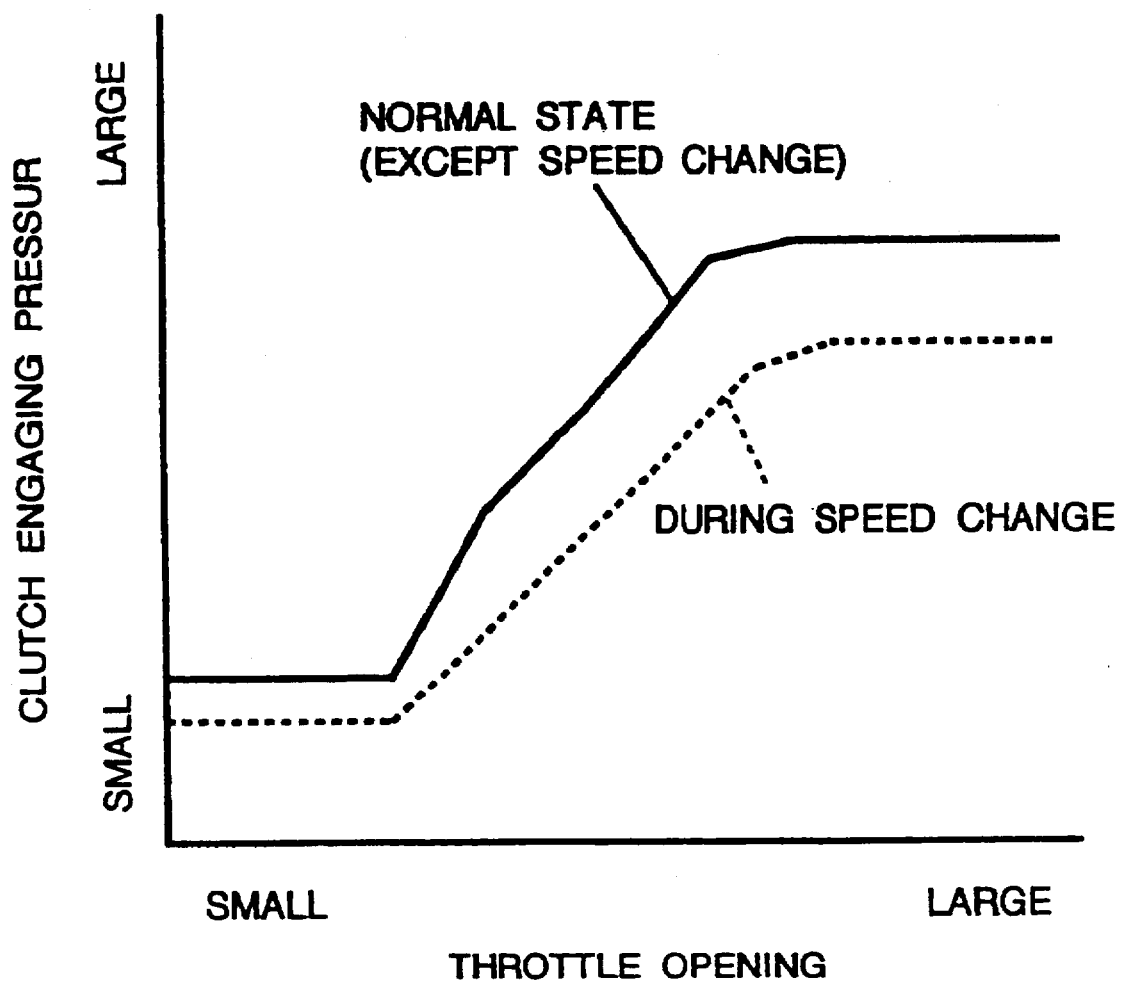
FIG. 17 is a graph illustrating the relationship between a throttle opening and an oil pressure for engagement of the clutch in an automatic transmission.

FIG. 17 is a graph illustrating the relationship between the throttle opening and the oil pressure for the engagement of the clutch in the automatic transmission. In FIG. 17, the solid line designates the characteristic of the oil pressure in a normal state, and the dotted line designates the characteristic of the oil pressure during the change of speed. As clearly shown in FIG. 17, the oil pressure is decreased during the change of speed, in order to lessen the impact of a shock of the speed-change. However, the real engine torque is not necessarily proportional to the throttle opening as shown in FIG. 18.

Figure 18:
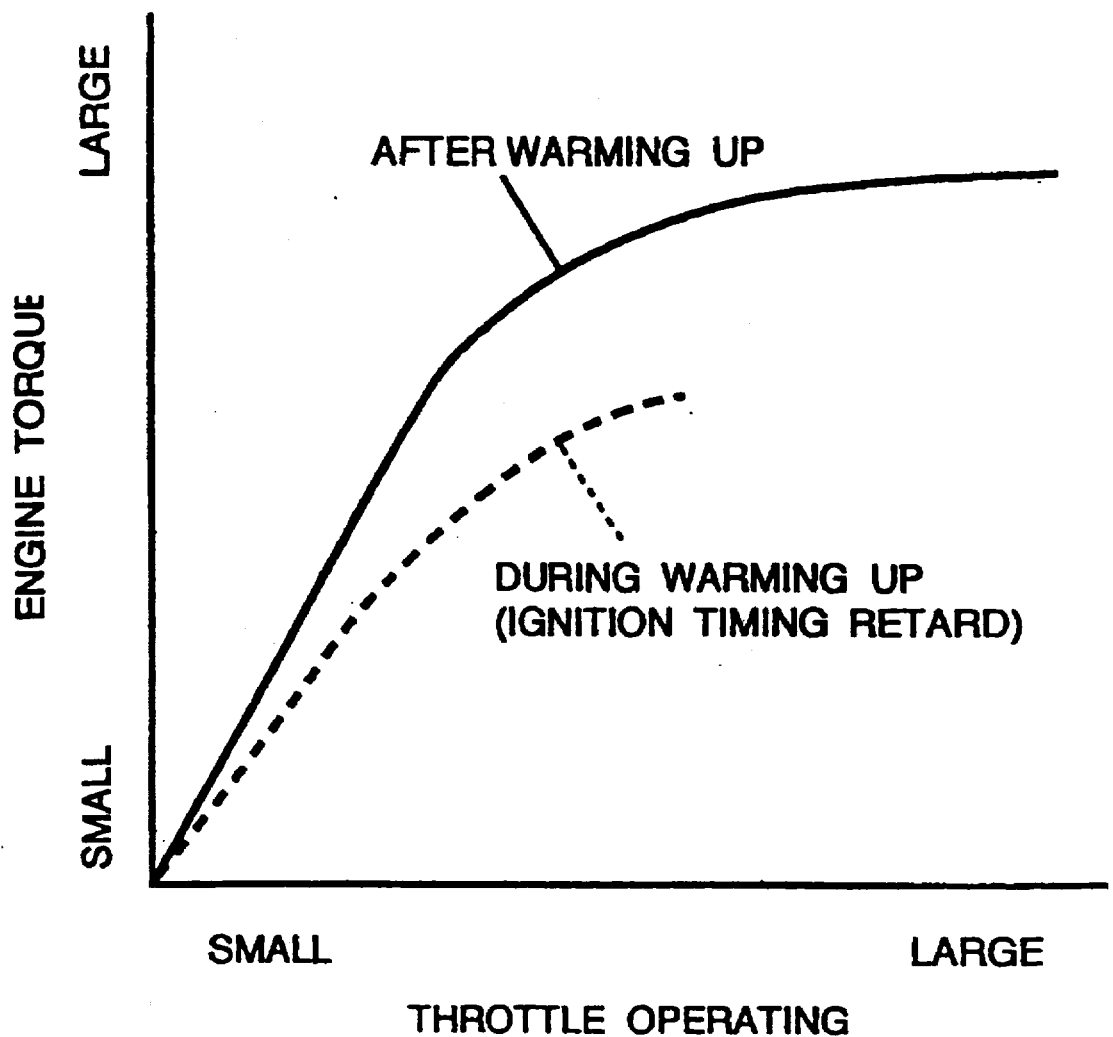
FIG. 18 is a graph illustrating the relationship between the throttle opening and the torque of the engine.

FIG. 18 is a graph illustrating the relationship between the throttle opening and the engine torque. Even if the throttle opening is held in a steady state, the torque of the engine changes sometimes. In such a case, the torque of the drive shaft may change during the change of speed. In particular, when the present invention is applied, that is, the ignition timing is retarded, the torque of the engine drops with respect to the throttle opening. Therefore, the impact of the shock by the speed change is increased. Such a case will be explained further in detail with reference to FIG. 19.

Figure 19:
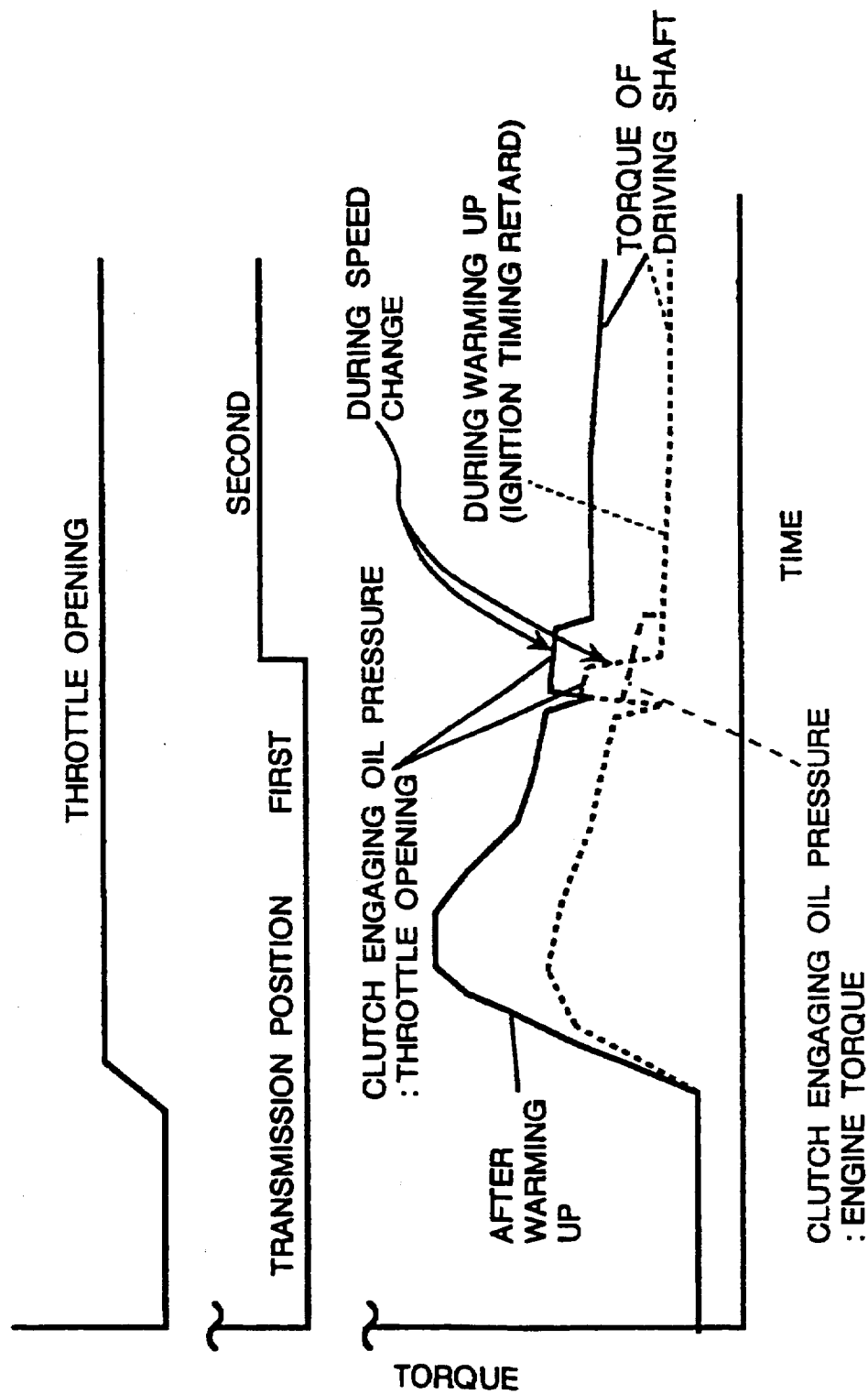
FIG. 19 is a graph illustrating the change of the torque of a drive shaft during the change of speed and the change of the throttle opening.

FIG. 19 is a graph showing the characteristic of the torque of the drive shaft with respect to time. The solid line designates the characteristic of the torque of the drive shaft after the warming-up of the engine, and the dotted line designates the characteristic of the torque of the drive shaft during the warming-up of the engine in which the ignition timing is retarded.

As seen from FIG. 19, if the throttle opening is increased fast, the torque of the drive shaft is firstly increased and then the change of speed is performed. In a state after the warming-up of the engine, the oil pressure of the clutch engagement is substantially matched to the throttle opening (solid line). Therefore, the shock of the speed-change is not occurred. However, in a state during the warming-up of the engine, both of them are not matched. When the control of the retard of the ignition timing is performed, the engine torque is low. Accordingly, the clutch is engaged in a short time, and thus the shock due to the speed-change is large.

In the present invention oil pressure for the engagement of the clutch is determined directly on the basis of the engine torque. It is, therefore, possible to engage the clutch in the time sufficient to reduce the shock caused by the speed-change, even if the torque of the engine is decreased (see the broken line of FIG. 19). The torque of the engine can be obtained by using the characteristic of the torque converter such as the rate of rotation of an input/output shaft of the torque converter, the coefficient of capacity of a pump, and the torque. Further, it is also possible to obtain the torque of the engine by using a torque sensor and the fuel amount.

The effects of the speed-up of the mixing of a fuel and an air by the by-pass type valve 74 are different every opening of the throttle valve 71. It is, therefore, possible to obtain bigger engine torque by adjusting the opening of the by-pass type valve 74 according to the throttle opening. As a result, it becomes possible to expand the adjustable range of the ignition timing in the control of the retard of the ignition timing. It will be explained hereinafter that the opening of the by-pass type valve 74 is adjusting according to the throttle opening. In such an engine system in which the electrically controlled throttle is not equipped, the throttle opening and the accelerator pedal opening have the same meaning. Namely, in case that the electrically controlled throttle is not equipped, the accelerator pedal opening means the throttle opening.

Figure 20:
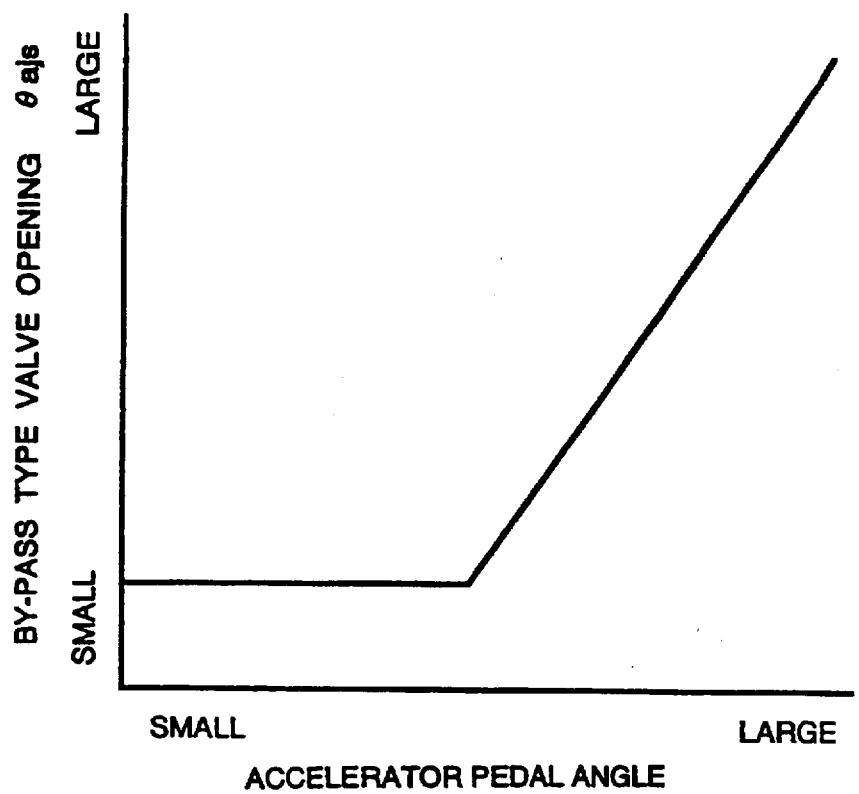
FIG. 20 is a graph illustrating the relationship between the opening of a by-pass type valve and an accelerator pedal angle.

FIG. 20 shows an example of the relationship between the opening of the by-pass type valve and the accelerator pedal angle. The relationship of FIG. 20 is stored in advance in a memory of the controlled unit 78 as a map of the opening þjs of the by-pass type valve.

Figure 33:
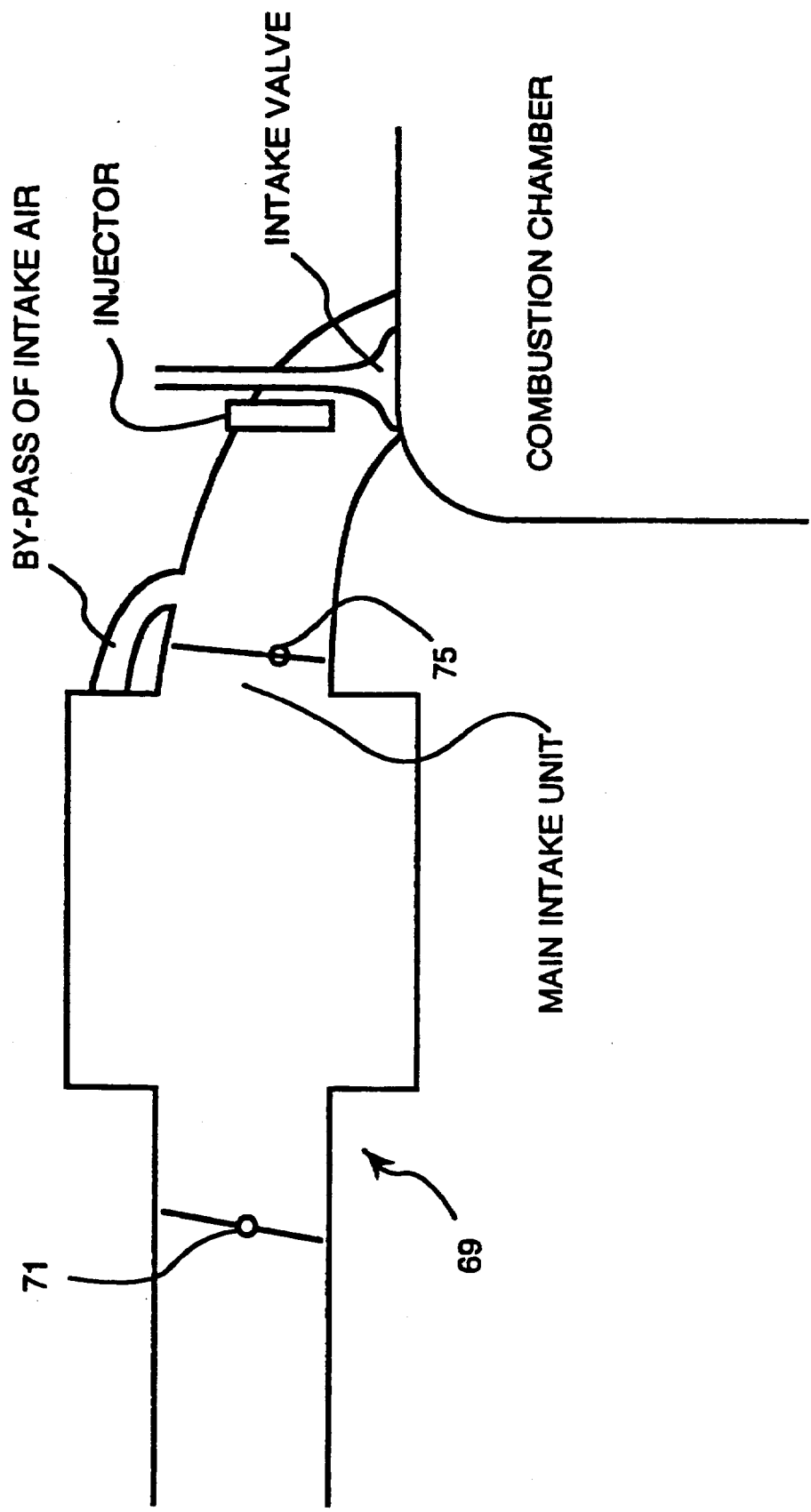
FIG. 33 is a schematic view showing the construction in the neighborhood of the by-pass type valve.

As shown in FIG. 20, if the accelerator pedal angle is small, the opening of the by-pass type valve 74 is lessen. In such a way, the intake air into the combustion chamber of the engine passes through a thin by-pass intake passage. Accordingly, the flow rate of the air is increased and thus the mixing of the fuel and the air is improved (see FIG. 33). Because the mixing condition is improved, the combustion can be stabilized. It is, therefore, possible to increase the temperature of the exhaust gas by retarding more the ignition timing.

While, if the accelerator pedal angle is large, the opening of the by-pass type valve 74 is increased according to the accelerator pedal angle. In such a way, it is possible to supply large amounts of air through a main intake passage to the combustion chamber. It is, therefore, possible to produce the torque sufficient to accelerate the vehicle.

By controlling the opening of the by-pass type valve according to the accelerator pedal angle as described above, it becomes possible to increase the retard amount of the ignition timing, and thus improve more the effect of the warming-up of the catalyst.

Figure 21:
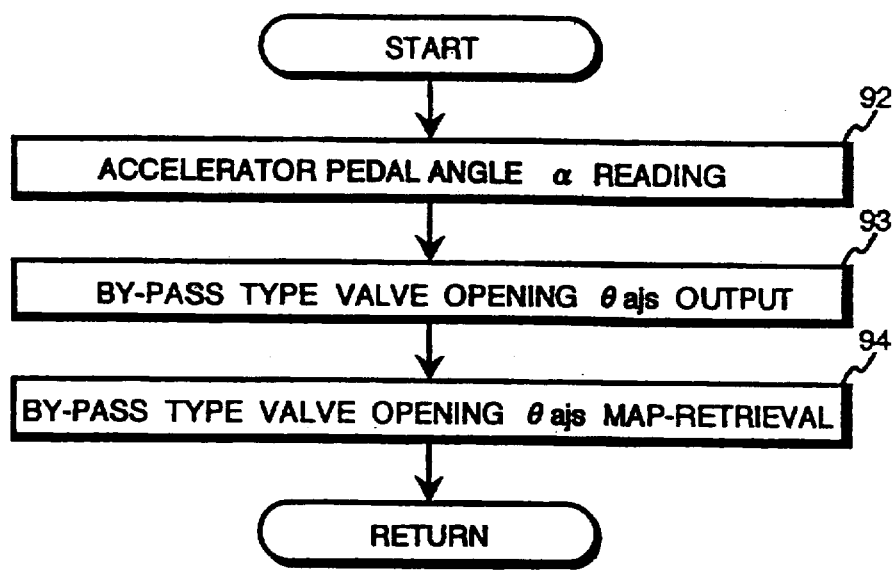
FIG. 21 is a flow chart illustrating the control of the opening of the by-pass type valve.

The processing of the control unit 78 will be explained with reference to FIG. 21, in which the control of the opening of the by-pass type valve is performed.

The control unit 78 first read the accelerator pedal angle þ in step 92. Then, the map indicative of the opening þajs of the by-pass type valve is retrieved in step 93, and thus the opening þajs of the by-pass type valve can be obtained, which is corresponding to the accelerator pedal angle þ. Finally, the opening þajs of the by-pass type valve obtained in step 93 is output to the drive motor 76 for the by-pass type valve in step 94.

The control for changing the relationship between the accelerator pedal angle and the throttle opening will be explained hereinafter with reference to FIG. 22.

Figure 22:
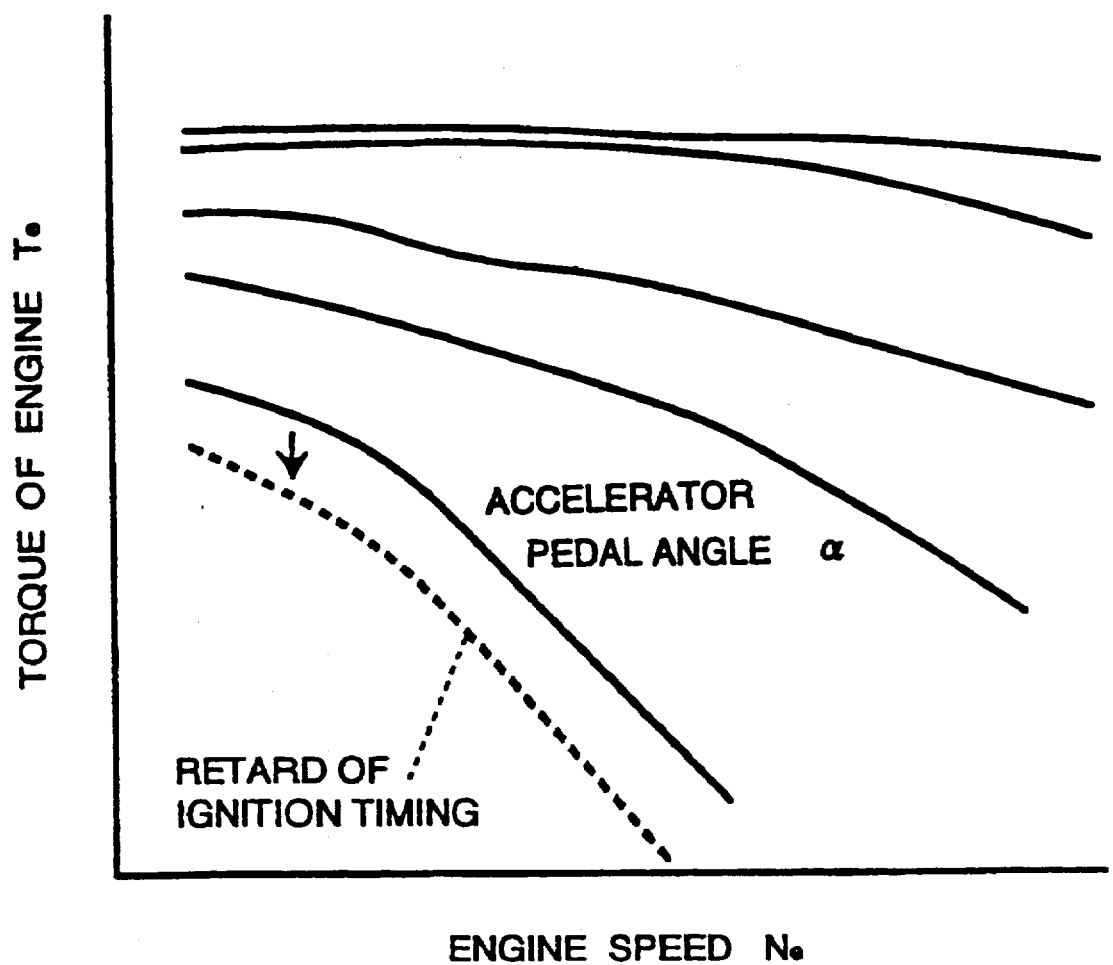
FIG. 22 is a graph illustrating the relationship between an engine speed and the torque of the engine, and showing a drop of the torque of the engine when the control of the retard of the ignition timing are performed.

FIG. 22 is a graph illustrating the relationship between the engine speed Ne and the torque $T_E$ of the engine. In FIG. 22, the solid line designates the torque of the engine in which the ignition is performed at the final ignition timing, and the dotted line designates the torque of the engine in which the control to retard the ignition timing is performed.

When the ignition timing is retarded, even if the throttle opening is fixed, the torque of the engine is dropped. As a result, the depression amount of the accelerator (accelerator pedal angle) becomes different from the driver's feeling of acceleration for a while.

The present invention uses the electrically controlled throttle, and changes the relationship between the accelerator pedal angle and the throttle opening according to the extent of the retard control.

The throttle opening is held larger than the normal opening. Thereby, it is possible to compensate the drop of the torque of the engine. In this case, the throttle valve is controlled by using the characteristic of the torque of the engine as a target value, in which the control to retard the ignition timing is not performed.

Figure 23:
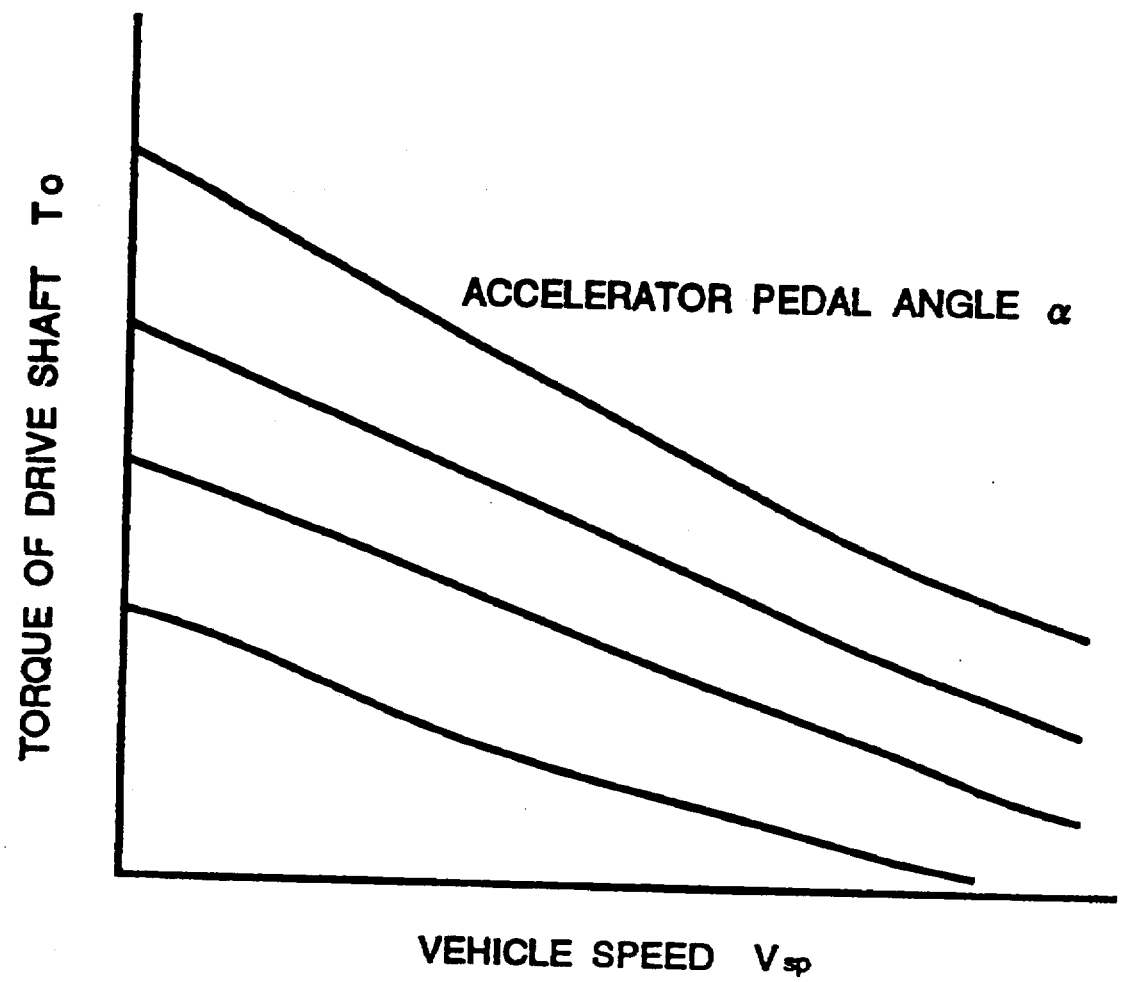
FIG. 23 is a graph illustrating the relationship between the speed of a vehicle and the torque of the drive shaft.

FIG. 23 shows the characteristic of the torque of the drive shaft (the output shaft of the automatic transmission). In FIG. 23, the torque of the drive shaft is used as athe target value. The throttle opening (the target throttle opening) in which the target torque of the drive shaft can be obtained, is determined in consideration of the ratio of speed-change and the characteristic of the torque converter. By contolling the throttle opening in such a way that the target throttle opening can be obtained, it is possible to obtain the feeling of acceleration which the driver intends. Thereby, the improvement of exhaust performance due to the faster catalyst light-off and the improvement of drivability become compatible with each other. To control the throttle opening in such a way that the target torque set in advance can be obtained, is referred as a target torque control.

Figure 24:
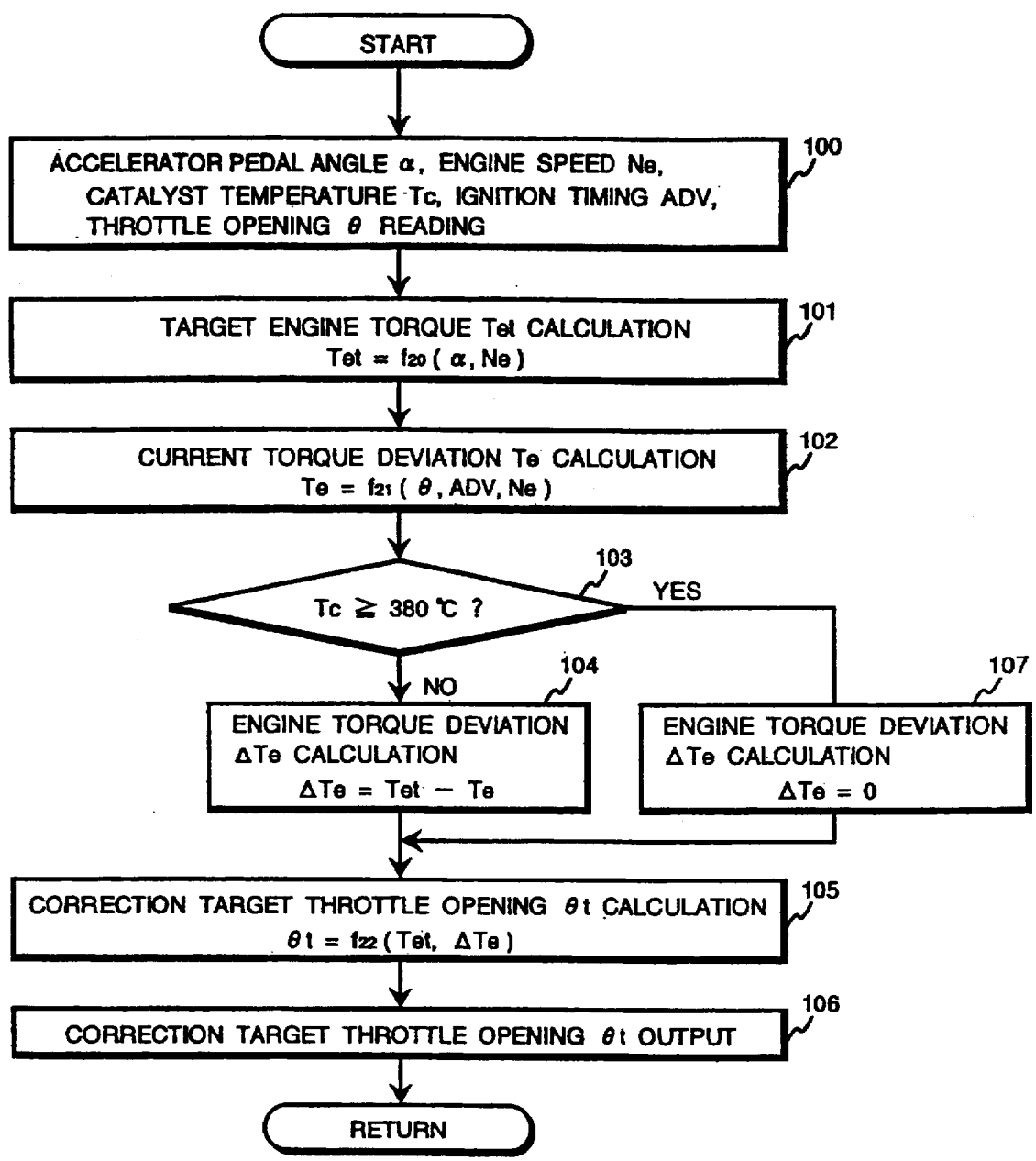
FIG. 24 is a flow chart illustrating the control of a target torque.

FIG. 24 shows the operation of the control unit 78 in which the target torque control is performed.

The control unit 78 first reads the accelerator pedal angle þ, the engine speed Ne, the temperature Tc of the catalyst, the ignition timing ADV and the throttle opening þ from the sensors mounted at various positions of the engine in step 100. Then, the target torque (the engine torque) Tet is obtained according to the function $f_{20}$, which has the accelerator pedal angle α and the engine speed Ne as parameters.

Further, the control unit 78 obtains the current engine torque Te by using a data table or function $f_{22}$, stored in advance in a memory in step 102. The data table of the function $f_{21}$ indicates the relationship between the θ which changes according to the ignition timing ADV and the engine speed Ne, and the engine torque Te.

After that, by determining whether or not the temperature Tc of the catalyst is larger than 380° C., it is determined whether or not the retard control of the ignition timing is performed (step 103). If the temperature Tc of the catalyst is not larger than 380°C., then it is determined the engine is in a warming-up state and the processing advances to step 104. In step 104, the control unit 78 obtains the deviation ΔTe by using the target torque Tet and the engine torque Te.

While, if the temperature Tc of the catalyst is larger than 380° C. in step 103, then it is determined that the warming-up has completed and the processing advances to step 107. In step 107, 0 is substituted into the deviation ΔTe.

After the completion of step 104 or step 107, the processing advances to step 105, in which the control unit 78 obtains the correction target throttle opening þt according to the function $f_{22}$. Where, the function $f_{22}$ is a function of the target torque Tet and the engine torque Te. The correction target throttle opening þ obtained in such a way is output the electrically controlled throttle 79 in step 106. After that, the processing is returned.

By the control described above, the target torque control can be performed even when the catalyst is warming up.

Finally, the functions and the constants described hereinbefore will be explained.

With respect to the function $f_1$: (see step 17 of FIG. 6)

The data table is preset, which provides for the relationship between the engine speed Ne, the width Tp of fundamental fuel injection, and the normal injection timing, and stored in the memory of the control unit 78. The data table is used as the function $f_1$. In other words, by referring the data table, the normal ignition timing adv is obtained, which corresponds to the input engine speed Ne and the amount of the fundamental fuel injection.

Figure 25:
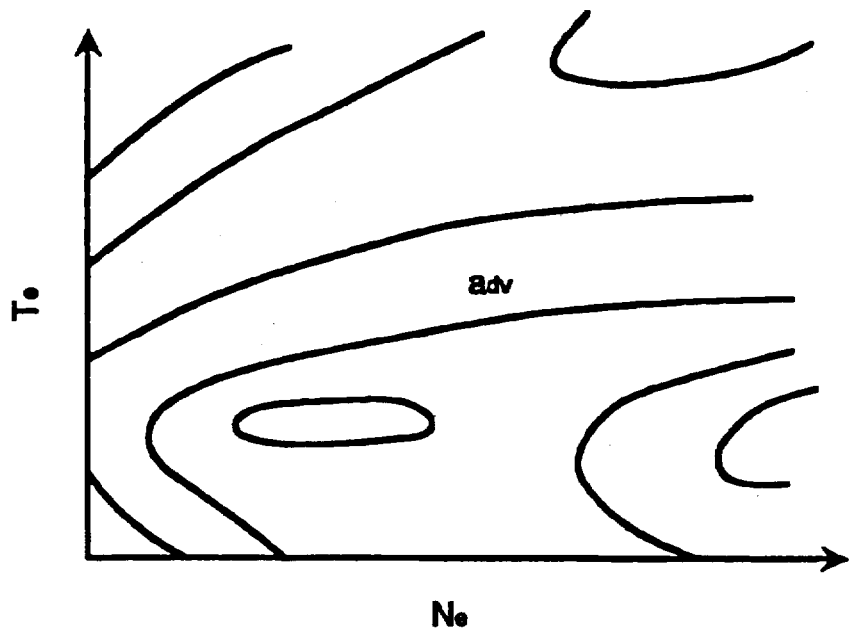
FIG. 25 is a schematic view illustrating the function $f_1$.

FIG. 25 shows an example of the data table or the function $f_1$, in which the normal ignition timing adv is shown by contour lines.

As to the function $f_2$: (see step 25 of FIG. 6)

The function $f_2$ is used to reflect the current warming-up state on the determination of the correction ignition timing þadv. Namely, outputs of the function $f_2$ are set to the correction ignition timing padv, the correction amount for the normal ignition timing adv. Where, the warming-up state is represented typically by the catalyst temperature Tc and the water temperature Tw, and the outputs of the function $f_2$ are set on the basis of those values.

In fact, the data table is prepared, which provides for the relationship between the catalyst temperature Tc and the water temperature Tw, and the outputs of the function $f_2$. The data table is stored in advance in the memory of the control unit 78. Therefore, the outputs of the function $f_2$ can be obtained by referring the data table.

However, it is impossible to determine the real correction ignition timing padv only according to the function $f_2$, because the correction value $k_1$, for the fluctuation of the torque is also used in addition to the function $f_2$, in order to determine the correction ignition timing þadv.

The function $f_3$: (see step 44 of FIG. 11)

The function $f_3$ is used for the determination of the width Te of the fuel injection pulse based on the air amount Qa, the engine speed Ne, the water temperature Tw, the correction factor a for acceleration, the catalyst temperature Tc and the setting coefficient KMR for the A/F. The function $f_3$ used here is as follows.

$$f_3 = KMR \cdot (Qa/Ne+a') \cdot Tw' \cdot Tc'$$

where, a' is the value determined on the basis of the input correction factor a for acceleration, Tw' is the value determined on the basis of the input water temperature Tw, Tc' is the value, and KMR is the correction factor for changing the A/F according to the catalyst temperature.

Figure 26:
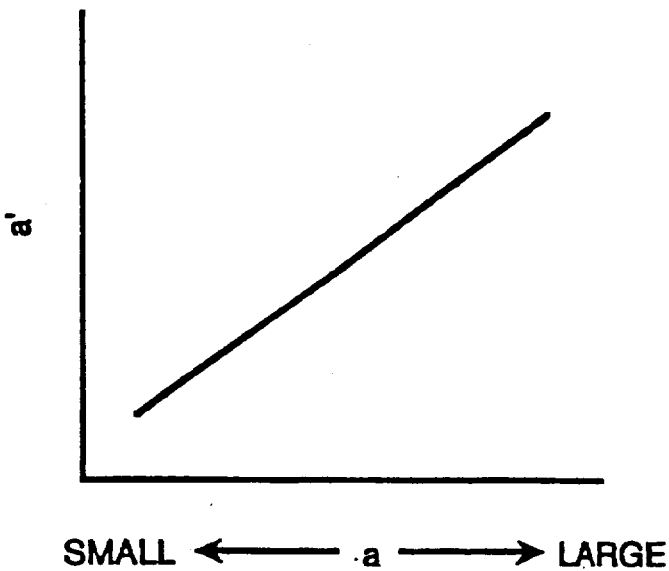
FIG. 26 is a view illustrating the concept of a data table stored the relationship between a' and a correction coefficient a of acceleration.

The data table is stored in advance in the memory of the control unit 78, which provides for the relationship between the a' and the correction factor a for acceleration. Therefore, it is possible to obtain the a' by referring to the data table. An example of the data table is shown in FIG. 26.

Figure 27:
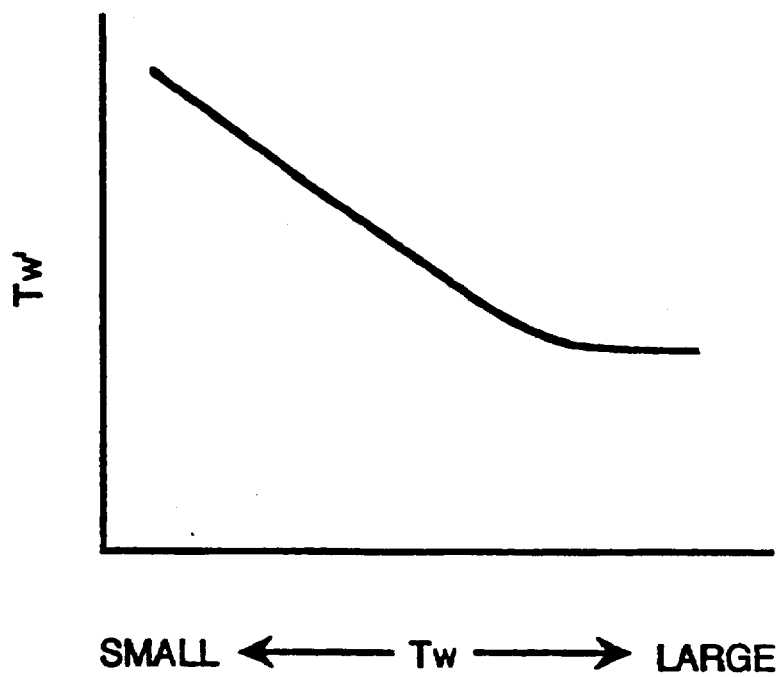
FIG. 27 is a view illustrating the concept of a data table stored the relationship between Tw' and the temperature of water Tw.

The data table is stored in advance in the memory of the control unit 78, which provides for the relationship between the Tw' and the water temperature Tw. Therefore, it is possible to obtain the Tw' by referring to the data table. An example of the data table is shown in FIG. 27.

Figure 28:
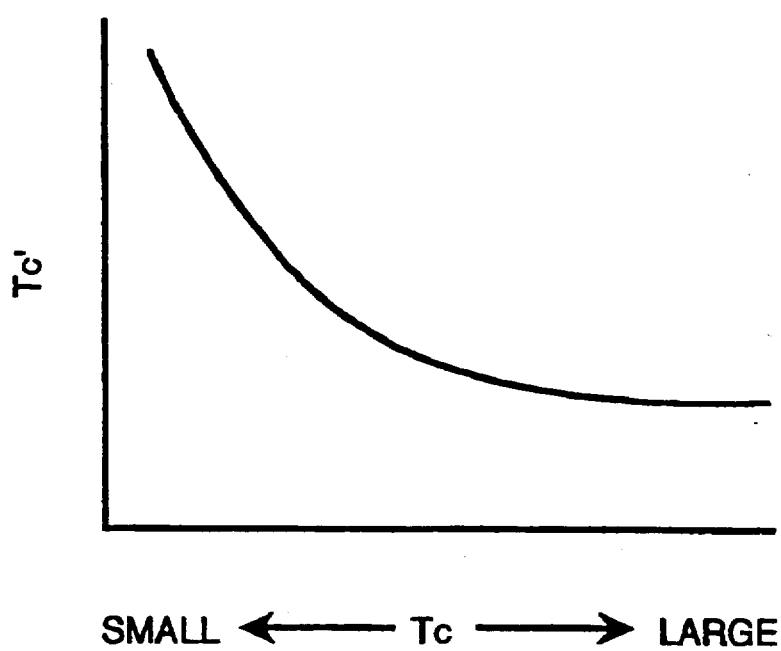
FIG. 28 is a view illustrating the concept of a data table stored the relationship between Tc' and the temperature of the catalyst Tc.

The data table is stored in advance in the memory of the control unit 78, which provides for the relationship between the Tc' and the catalyst temperature Tc. Therefore, it is possible to obtain the Tc' by referring to the data table. An example of the data table is shown in FIG. 28.

Figure 29:
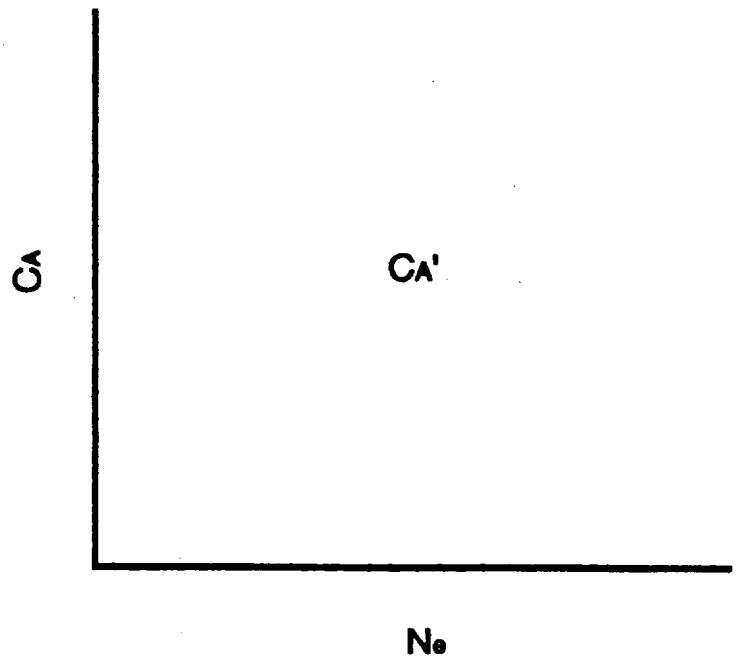
FIG. 29 is a view illustrating the concept of a data table stored the relationship between CA, CA' and Ne.

The KMR is predetermined according to the catalyst temperature and stored in advance in a memory. An example of the KMR is shown in FIG. 29.

The function $f_4$: (see step 45 of FIG. 11)

The function $f_4$ is used for obtaining the fuel injection timing tin based on the width Te of the fuel injection pulse, the engine speed Ne and the crank angle CA. The function $f_4$ used here is as follows.

$$f_4 = Te + CA'$$

where, CA is the crank angle at the completion of fuel injection.

The data table is stored in advance in the memory of the control unit 78, which provides for the relationship between the CA', and the crank angle CA and the engine speed Ne. Therefore, it is possible to obtain the CA' by referring to the data table. An example of the data table is shown in FIG. 29.

The function $f_5$: (see step 55 of FIG. 11)

The function $f_5$ is used for determining the fuel amount Gf based on the width Te of the fuel injection pulse. The function $f_5$ used here is as follows.

$$f_5 = (Te_{max} \cdot Gf_{max})/Te$$

where, $Te_{max}$ is the pulse width at full open of an injector and $Gf_{max}$ is the maximum flow at full open of the injector.

The function $f_6$: (see step 58 of FIG. 11)

The function $f_6$ is used for determining a motor current A to drive the motor for controlling the secondary air according to the amount $Q_2$ of the target secondary air.

Figure 30:
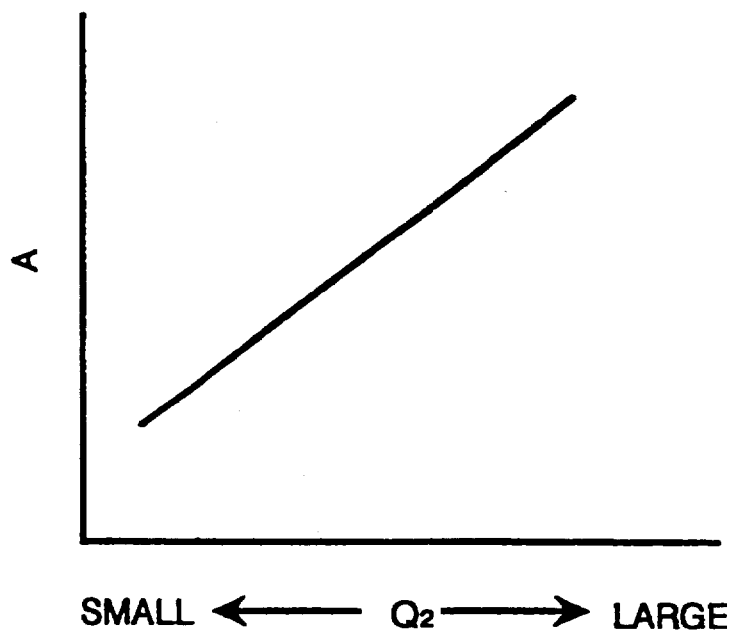
FIG. 30 is a graph illustrating the relationship between A and $Q_2$.

The data table is stored in advance in the memory of the control unit 78, which provides for the relationship between the $Q_2$ and the motor current A. Therefore, it is possible to obtain the motor current A by referring to the data table. An example of the data table is shown in FIG. 30.

The function $f_7$: (see step 58 of FIG. 11)

The function $f_7$ is used for obtaining the drive timing tair for the motor to control the secondary air based on the crank angle $k_8$ at the timing of close of the exhaust valve, the engine speed Ne and the crank angle CA. The function $f_7$ used here is as follows.

$$f_7 = k_8 + CA''$$

where, CA" is a reference signal for the crank angle.

Figure 31:
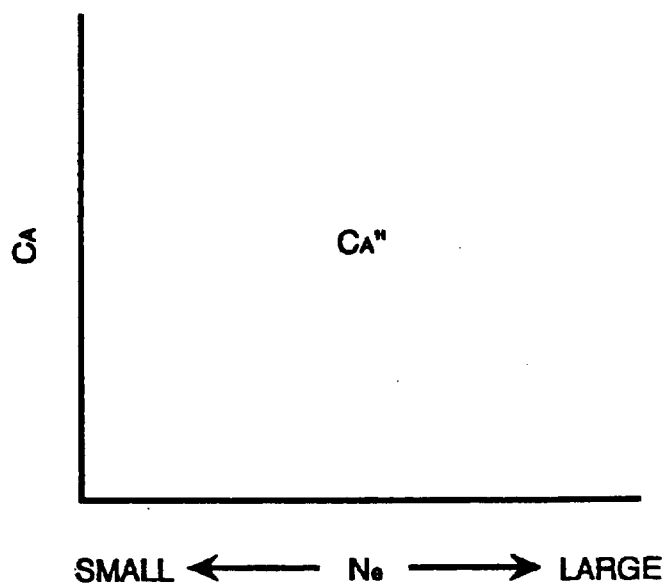
FIG. 31 is a view illustrating the concept of a data table stored the relationship between CA, CA" and Ne.
Figure 32:
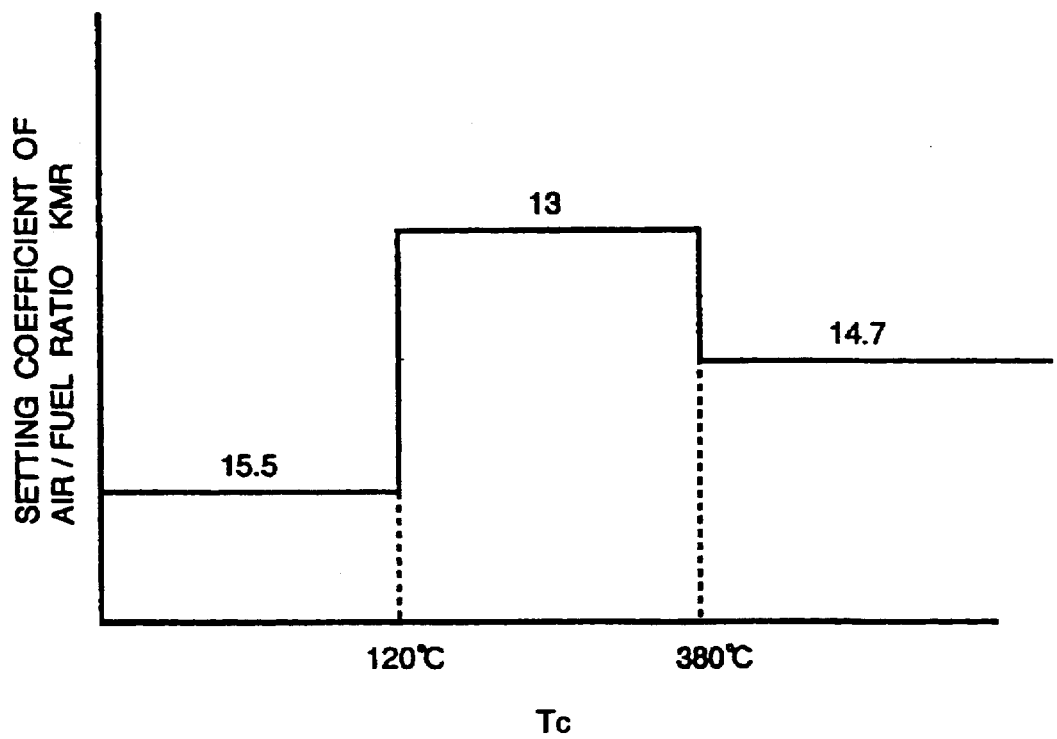
FIG. 32 is a view showing an example of a coefficient of air/fuel ratio setting.

The data table is stored in advance in the memory of the control unit 78, which provides for the relationship between the CA", and the crank angle CA and the engine speed Ne. Therefore, it is possible to obtain the CA" by referring to the data table. An example of the data table is shown in FIG. 31.

The function $f_8$: (see step 56 of FIG. 11)

The function $f_8$ is used for obtaining the target secondary air flow Q2. The function $f_8$ used here is as follows.

$$f_8 = Gf \cdot k_7$$

where, $k_7$ is the correction factor for the secondary air (see step 54 of FIG. 11), and Gf is the fuel amount (see step 55 of FIG. 11).

According to the embodiments described hereinbefore, it is possible to perform the retard control of the ignition timing in such a way that the fluctuation in torque may be nearly occurred. Therefore, the faster catalyst light-off and the drivability can be compatible with each other.

It is further understood by those skilled in the art that the foregoing description is a preferred embodiment of the disclosed means and that various changes and modifications may be made in the invention without departing from the spirit and scope thereof. For example, most means disclosed in the embodiments of the present invention can be performed by computer programs.

We claim:

1. An engine system in which an ignition timing of an engine is changed in accordance with engine operation parameters, comprising exhaust gas clarifying equipment including a catalyst for clarifying specified components in exhaust gas, a catalyst temperature detector for one of estimating and detecting the temperature of the catalyst, a torque fluctuation detector for detecting an actual output torque fluctuation state of the engine, and an ignition timing calculator for calculating final ignition timing on the basis of detected results of said torque fluctuation detector and said catalyst temperature detector.

2. An engine system according to claim 1, wherein said ignition timing calculator advances the final ignition timing when the output torque fluctuation is larger than a predetermined value.

3. An engine system according to claim 2, wherein said ignition timing calculator comprises a correction ignition timing calculator for calculating the correction amount of retard on the basis of the detected results of said catalyst temperature detector and said torque fluctuation detector, and a final ignition timing calculator for calculating the final ignition timing by using said correction amount of retard and a normal ignition timing determined in accordance with an engine operation parameter.

4. An engine system according to claim 3, wherein said correction ignition timing calculator decreases a correction amount of retard angle when fluctuation of the engine output torque is larger than a predetermined value.

5. An engine system according to claim 1, wherein said torque fluctuation detector detects when the output torque of the engine reaches a peak value and detects the fluctuation of output torque on the basis of the magnitude of timing variations.

6. An engine system according to claim 5, wherein said torque fluctuation detector comprises a crank angle detector and a calculator for calculating a time-varying rate of the crank angle.

7. An engine system according to claim 5, wherein said torque fluctuation detector comprises a cylinder internal pressure detector for detecting internal pressure of an engine combustion chamber.

8. An engine system according to claim 1, wherein said ignition timing calculator determines ignition timing obtained on the basis of engine operation parameters as the final ignition timing when a temperature of the catalyst is outside a predetermined range.

9. An engine system according to claim 7, wherein said ignition timing calculator comprises a correction ignition timing calculator for calculating the correction amount of retard on the basis of detected results of said catalyst temperature detector and said torque fluctuation detector, and a final ignition timing calculator for obtaining the final ignition timing by using said correction amount of retard and a normal ignition timing determined in accordance with the engine operation parameters.

10. An engine system according to claim 9, wherein said correction ignition timing calculator sets the correction amount of retard to zero when the temperature of the catalyst is outside a predetermined temperature range.

11. An engine system according to claim 10, wherein the predetermined temperature range is between a temperature at which the catalyst starts clarification of CO and a temperature at which the catalyst starts clarification of HC.

12. An engine system according to claim 1, further comprising;

an exhaust gas state detector for detecting components of one of exhaust gas and air/fuel ratio, a reaction start determining unit for determining if the temperature of the catalyst has reached a temperature at which specified materials can be clarified on the basis of the temperature of the catalyst obtained by the catalyst temperature detector, a target secondary air amount setting unit for determining an air amount induced to an exhaust pipe on the basis of the detected result of the exhaust gas state detector, and a secondary air inducing unit for inducing the air amount determined by the target secondary air amount setting unit into the exhaust pipe in an upper stream of said exhaust gas clarifying equipment when said reaction start determining unit determines that the temperature of the catalyst has reached the clarification temperature for clarifying the specified materials.

13. An engine system according to claim 12, further comprising a crank angle detecting detector for detecting a crank angle of the engine, wherein said secondary air inducing unit starts to induce air to the exhaust pipe when an engine exhaust valve is closed on the basis of the result detected by said crank angle detector.

14. An engine system according to claim 13, further comprising an air/fuel ratio control for controlling independently the air/fuel ratio of air mixture in each engine cylinder, wherein said secondary air inducing unit induces air to the exhaust pipe when an exhaust valve in the respective engine cylinder in which the amount of fuel injection is increased is closed to decrease a target air/fuel ratio provided to the engine by said air/fuel ratio control.

15. An engine system according to claim 1, further comprising a crank angle detector for detecting engine speed and crank angle, a target air/fuel ratio setting unit for setting an air/fuel mixture ratio supplied to the engine, a fuel injection amount calculator for obtaining an amount of fuel injection required to obtain the air/fuel mixture ratio set by said target air fuel ratio setting unit, a reaction start determining unit for determining if the catalyst has reached the temperature at which specified material can be clarified on the basis of the temperature of the catalyst obtained by said catalyst temperature detector, and a fuel injection unit for supplying to the engine the amount of fuel injection obtained by said fuel injection amount calculator when said reaction start determining unit determines that the temperature of the catalyst has reached the clarification temperature for the specified materials.

16. An engine system according to claim 1, further comprising an air mixture forming unit for adjusting the air mixture supplied to the engine.

17. An engine system according to claim 16, wherein said air mixture forming unit changes the air mixture in accordance with opening of an engine throttle valve.

18. An engine system according to claim 3, further comprising a driver-operated accelerator pedal, and an electronically controlled throttle for adjusting an opening of a throttle valve in accordance with an amount of movement of the accelerator pedal, wherein said electronically controlled throttle changes a relationship between the amount of movement of the accelerator pedal and the opening of the throttle valve in accordance with the correction amount of retard determined by said ignition timing calculator.

19. A method of controlling an engine comprising the steps of:

monitoring actual fluctuation of engine output torque and an engine warming-up state, and retarding an ignition timing by an amount of retard determined based on the magnitude of a change in the engine output torque and the engine warming-up state when a catalyst temperature is lower than a predetermined temperature.

20. An engine control method according to claim 19, wherein the engine warming-up state is represented by engine coolant temperature and the catalyst temperature for clarifying specified exhaust gas components.

* * * * *